US012573361B2

(12) United States Patent
Fishman et al.

(10) Patent No.: US 12,573,361 B2
(45) Date of Patent: Mar. 10, 2026

(54) PICKUP DEVICES OPTIMISED FOR AMPLIFYING AN ACOUSTIC GUITAR

(71) Applicant: Fishman Transducers, Inc., Andover, MA (US)

(72) Inventors: Lawrence Fishman, Winchester, MA (US); Ching-Yu Lin, Andover, MA (US)

(73) Assignee: Fishman Transducers, Inc., Andover, MA (US)

( * ) Notice: Subject to any disclaimer, the term of this patent is extended or adjusted under 35 U.S.C. 154(b) by 0 days.

(21) Appl. No.: 18/905,414

(22) Filed: Oct. 3, 2024

(65) Prior Publication Data

US 2025/0118281 A1 Apr. 10, 2025

Related U.S. Application Data

(60) Provisional application No. 63/588,367, filed on Oct. 6, 2023.

(51) Int. Cl.
*G10H 3/12* (2006.01)

(52) U.S. Cl.
CPC .................................... *G10H 3/12* (2013.01)

(58) Field of Classification Search
CPC ........................................................ G10H 3/12
See application file for complete search history.

(56) References Cited

U.S. PATENT DOCUMENTS 4,378,722 A * 4/1983 Isakson .................. G10H 3/185
984/371
4,394,830 A * 7/1983 Damiano ................. G10H 3/18
984/367
4,501,186 A * 2/1985 Ikuma .................... G10H 3/182
84/DIG. 24
4,878,412 A * 11/1989 Resnick ................. G10H 3/181
336/83
5,221,805 A * 6/1993 Lace ...................... G10H 3/181
84/726
5,401,900 A * 3/1995 Lace ...................... G10H 3/181
84/727

(Continued)

OTHER PUBLICATIONS

J. Donald Tillman, "Guitar Pickup Response Demonstration", Sep. 12, 2014, https://till.com/articles/PickupResponse/.

(Continued)

*Primary Examiner* — Jeffrey Donels
(74) *Attorney, Agent, or Firm* — PEARL COHEN ZEDEK LATZER BARATZ LLP

(57) ABSTRACT

A transducer or pickup system amplifying musical instruments (such as, e.g., an acoustic guitar), including at least one magnet, at least one inductance coil coupled to the magnet(s), and an arc shaped housing enclosing magnet(s) and inductance coil(s). Some embodiments of the invention may provide unique sound characteristics due to comb filtering effects associated with an arc shape arrangement of magnets and/or coils in the pickup. In some embodiments the arc shaped pickup and/or housing may be placed within 7.0-7.5 inches of an edge of a guitar's bridge, and/or may be clamped to the edge of a guitar's sound hole, and/or may be aligned with a circumference of the sound hole. Different configurations are described with regard to nonlimiting embodiments.

18 Claims, 21 Drawing Sheets

(56) References Cited

U.S. PATENT DOCUMENTS

| | | | | |
|---|---|---|---|---|
| 5,438,158 | A * | 8/1995 | Riboloff | G10D 1/08 84/727 |
| 5,523,526 | A * | 6/1996 | Shattil | H05K 9/00 84/728 |
| 5,552,562 | A * | 9/1996 | Hertz | G10H 3/146 84/727 |
| 6,348,791 | B2 * | 2/2002 | Shattil | H05K 9/00 324/225 |
| 6,846,981 | B2 * | 1/2005 | Devers | G10H 3/181 84/728 |
| 7,015,390 | B1 * | 3/2006 | Rogers | G10H 1/32 84/723 |
| 8,212,137 | B1 * | 7/2012 | Hosler | G10H 1/32 84/743 |
| 8,519,251 | B2 | 8/2013 | Lingel | |
| 8,907,199 | B1 * | 12/2014 | Dixon | G10H 3/181 84/743 |
| 10,475,429 | B2 * | 11/2019 | Iori | H04R 3/04 |
| 2002/0083819 | A1 * | 7/2002 | Kinman | G10H 3/181 84/728 |
| 2004/0159225 | A1 * | 8/2004 | Barr | G10H 3/185 84/743 |
| 2006/0156913 | A1 * | 7/2006 | Fishman | G10H 1/32 84/743 |
| 2008/0156180 | A1 * | 7/2008 | Bagale | G10H 1/40 84/743 |
| 2012/0118129 | A1 * | 5/2012 | Jang | G10H 3/181 84/726 |
| 2013/0276621 | A1 * | 10/2013 | Bekerman | G10H 3/181 84/723 |
| 2015/0199949 | A1 * | 7/2015 | Fishman | G10H 3/18 84/726 |
| 2018/0322857 | A1 * | 11/2018 | Mills | G10H 3/181 |
| 2019/0108823 | A1 * | 4/2019 | Palmieri | G10D 1/085 |
| 2020/0118535 | A1 * | 4/2020 | Huang | G10H 3/143 |
| 2023/0335096 | A1 * | 10/2023 | Spartan | G10H 3/182 |
| 2024/0203380 | A1 * | 6/2024 | Shibata | G10D 1/085 |

OTHER PUBLICATIONS

J. Donald Tillman, “Response Effects of Guitar Pickup Position and Width”, Sep. 12, 2014, https://till.com/articles/PickupResponseDemo/.

* cited by examiner

Scale Length: 24 inches
Open String Frequency: 110 Hz
Number of Frets: 21

300A

| Pickup Number | Position (inches from bridge) |
|---|---|
| 1 | 5.5 |
| 2 | 5.5 |
| 3 | 5.5 |
| 4 | 5.5 |
| 5 | 5.5 |
| 6 | 5.5 |

Scale Length: 24 inches
Open String Frequency: 110 Hz
Number of Frets: 21

300B

| Pickup Number | Position (inches from bridge) |
|---|---|
| 1 | 5.5 |
| 2 | 6.25 |
| 3 | 7.0 |
| 4 | 7.0 |
| 5 | 6.25 |
| 6 | 5.5 |

Wind fuse-able magnetic wire on an oval shape bobbin

1. Remove bobbin top
2. Remove oval spacer
3. Push wound coil inward against bobbin core to form desired crescent moon shape Fuse and solidify formed wound coil Remove shaped wound coil from bottom bobbin Final Wound Coil

PICKUP DEVICES OPTIMISED FOR AMPLIFYING AN ACOUSTIC GUITAR

PRIOR APPLICATION DATA

The present application claims benefit from prior U.S. Provisional Application 63/588,367, filed on Oct. 6, 2023, and entitled "VARIABLE RELUCTANCE PICKUP OPTIMISED FOR AMPLIFYING AN ACOUSTIC GUITAR", which is incorporated by reference herein in its entirety.

FIELD OF THE INVENTION

The present invention relates generally to sound amplification and more specifically to devices used to electrically amplify acoustic plucked instruments.

BACKGROUND OF THE INVENTION

Sound amplification systems and devices used, e.g., for guitar amplification, present several shortcomings that affect, inter alia, both the sound quality and physical characteristics of the instrument. For example, some existing systems tend to color the sound significantly due to comb filtering, which can alter the natural tone of the guitar and detract from its original acoustic character. In addition, some systems are prone to electromagnetic interference (EMI), which can introduce unwanted noise and further degrade the sound quality. These issues as well as similar ones highlight the need for improved pickup designs that preserve the instrument's desirable acoustic properties while minimizing disruptions.

SUMMARY

Some embodiments may provide a transducer or pickup system for amplifying musical instruments (such as, e.g., an acoustic guitar).

Some embodiments of the invention may include at least one magnet, at least one inductance coil coupled to the magnet(s), and an arc shaped housing enclosing magnet(s) and inductance coil(s).

Some embodiments of the invention may provide unique sound characteristics due to comb filtering effects associated with an arc shape arrangement or positioning of magnets and/or coils within the pickup system or housing.

In some embodiments the arc shaped pickup and/or housing may be placed within 7.0-7.5 inches of an edge of a guitar's bridge, and/or may be clamped to the edge of a guitar's or musical instrument's sound hole, and/or may be aligned with a circumference of the sound hole.

Different configurations, placement and/or design parameters, and manufacturing considerations are described with regard to nonlimiting embodiments.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

Figure 1:
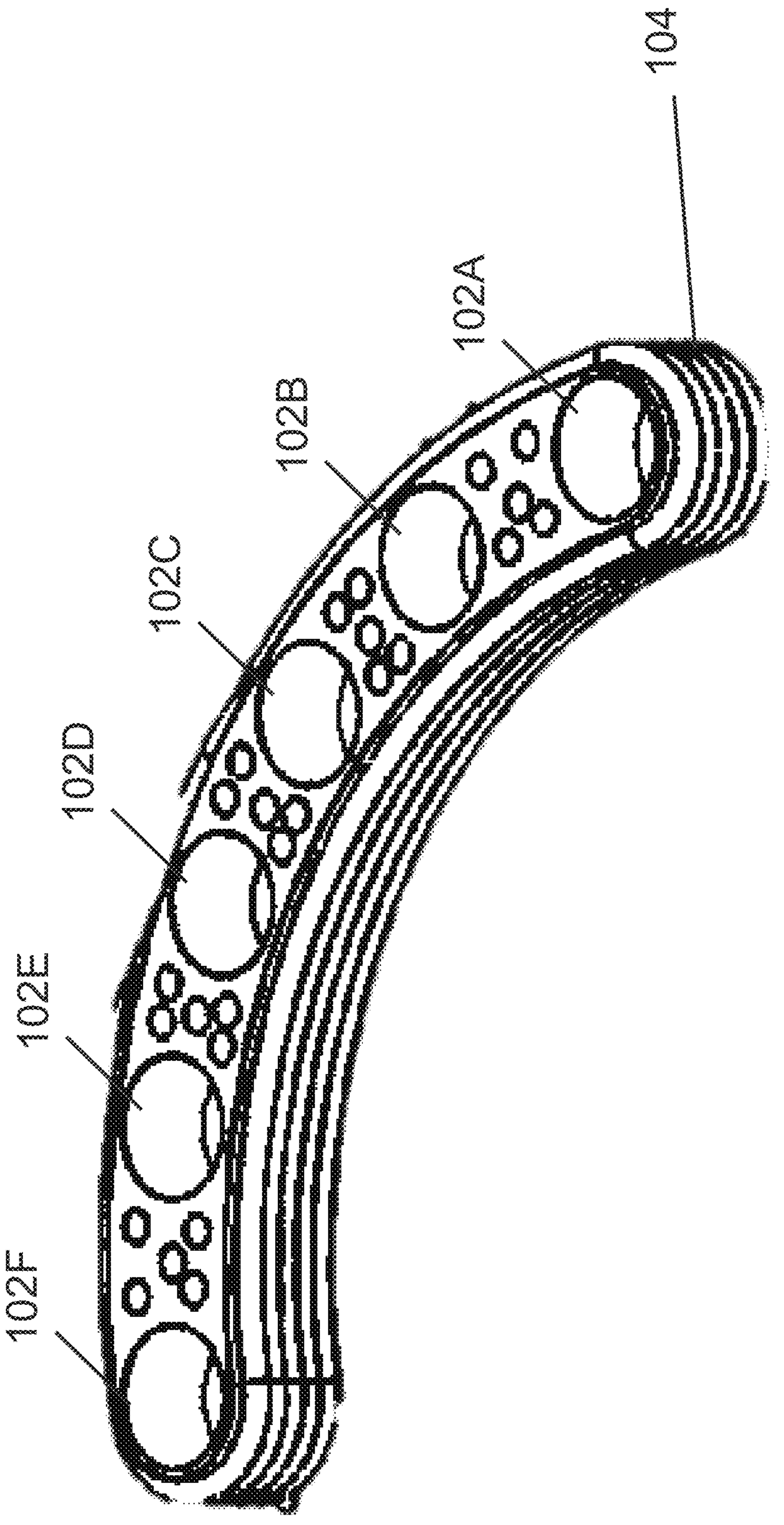
FIG. 1 shows an example transducer system according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

A pickup as used herein may refer to a transducer component or system that may be used for converting mechanical vibrations (e.g., of the guitar strings) into an electrical signal. The electrical signal may be amplified and processed by various sound processors, such as, e.g., amplifiers and effects pedals.

While different pickup system types may be used to amplify various instruments, each type may have various shortcoming.

Stand mounted microphones may be used to capture the projected sound when placed in front of an acoustic instrument, and may be particularly useful in a recording studio or very quiet environments. However, due to feedback issues (relating, e.g., to unwanted loops of sound created when an amplified signal re-enters the input, causing a high-pitched squealing or howling noise) and sound leakage from other instruments or sound sources, e.g., in a performance or stage setting, microphones may be difficult to manage in a live performance. Additionally, the performer may be required to maintain a stationary position for a microphone to be effective.

Top mounted or bridge plate mounted pickups may be transducers that include bending mode strain measuring devices or accelerometers. They may be used for picking up the vibrations of an acoustic instrument at moderate volumes. At higher volumes, however, they may be prone to feedback and may amplify undesirable noises, e.g., of string squeaks due to the players fingers sliding on the strings, rubbing of the player's arms and clothing on the surface of the instrument, percussive sounds of the picking attack and hand tapping sounds, and the like (e.g., due to sensing both the longitudinal and transverse vibrations on the instrument). While top mounted or bridge plate mounted pickup systems or devices may be inexpensive, determining the best mounting position on the instrument to achieve a balanced response may be unintuitive and may require a fair amount of trial and error. This problem may make them unsuitable for a production environment. Additionally, the optimum mounting of these devices often may require the use of a permanent type of adhesive such as an epoxy or cyanoacrylate style adhesive. In case the device must be removed during the placement trials or in case the device needs to be replaced due to a malfunction, damage to the wooden surface of the instrument may be difficult to avoid-which makes such systems undesirable for use, e.g., on higher value or vintage instruments.

Under the saddle piezoelectric pickups may be transducers built using an array of small piezoceramic elements or strips of piezoelectric polymer that may be covered with a shielding material and that may be terminated with miniature shielded coaxial cables. The transducer may be placed at the bottom of a slot in the bridge of the instrument and the cable is fed through a hole into the body cavity or sound hole of the instrument. The string supporting saddle of the instrument may be placed in the slot directly above the transducer. The saddle may be held in place by the tension of the tightened string. The transducers may measure the change in force imparted on the saddle by the vibrations of the plucked string. One shortcoming of saddle piezoelectric pickups may relate to the force sensing response and to the fact that they are located at the very end of the vibrating string. Because of their force sensing nature every component of the string vibration may become audible. For example, longitudinal waves, transverse waves, along any axis, any direction, and every harmonic may all create varying forces on the saddle and become part of the composite sound of the instrument. While in the hands of experienced musicians this may be a useful feature—it may be undesirable in the hands of less experienced players (e.g., this can be overly revealing and intimidating), as, e.g., finger sliding squeaks and percussive hand and pick noises may be difficult to avoid. In addition, due to their extremely fast attack, these sensors may produce an often-undesirable sound alteration or byproduct when played aggressively (often described or referred to as the "piezo quack").

Different combinations of different pickup system types, including the addition of instrument mounted mini microphones may be used in an attempt to mitigate some of the shortcomings associated with single source solutions, or with a single pickup type. These combined solutions tend to be complicated and expensive and may often not solve the underlying individual transducers shortcomings.

Variable reluctance or "magnet coil" pickups may be based on, e.g., standard electric guitar pickup designs with end extensions added to the cover that may allow ends of the pickup to be clamped to the edges of the instrument's sound hole such that (due to the shape of such pickups) the pickup is not at or near the edge of the hole except for the end points of the pickup. This is because such pickups are typically rectangular or straight, and do not follow the arced or circular edge of the sound hole. Magnet coil pickups may offer several advantages, such as, e.g., being easy to install or remove without damage to the instrument, being highly feedback resistant, and not amplifying finger squeaks, finger taps, picking noise, or body rubs (e.g., because such systems primarily detect the vibrations of the metal strings within their magnetic field, while ignoring most non-magnetic vibrations and external acoustic sounds that do not disturb the magnetic field). However, these systems too may suffer from undesirable shortcomings, such as, e.g., greatly coloring the sound due to comb filtering effects, and being prone to more EMI interference than the saddle or top mounted pickups.

Figure 4:
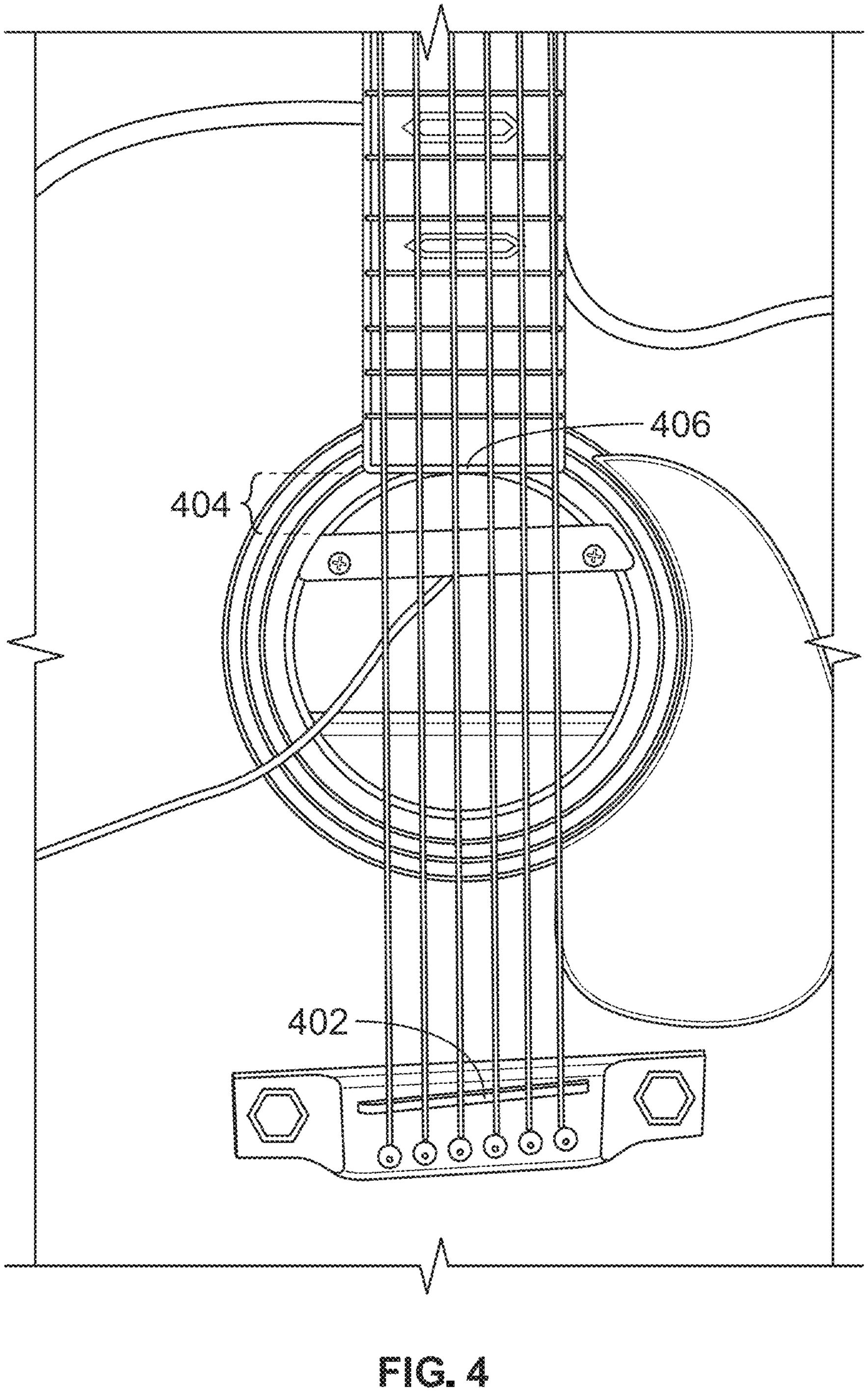
FIG. 4 illustrates example positioning considerations used for pickup devices according to some embodiments of the invention.

The physical presence of some pickup systems in the acoustic hole or cavity of the instrument may obstruct the acoustic hole or cavity by crossing the middle or a portion near the middle of the sound hole, or by creating a gap between the pickup and the edge of the sound hole or acoustic cavity (dividing the sound hole in two equal or unequal sections) as can be seen in FIGS. 4, 6—interfering with the projection of the main body Helmholtz resonance, which may be crucial for the instrument's natural sound projection. Positioning pickup systems in a strumming position, e.g., in or near the middle of the sound hole as in FIGS. 4, 6—may make the systems susceptible to being struck by the pick during strumming, potentially causing damage or producing unwanted noise. A clamping-style mounting of some systems might add stiffness to the guitar's top plate, and the additional weight may restrict a normally vibrating area and alter the resonant character of the instrument. The aesthetic of the sound hole mounting may be at odds or may conflict with the original design of the instrument.

Magnetic pickups such as, e.g., magnet coil pickup may only sense the velocity of the transverse displacement of a string. Consequently, the placement of the pickup may be required to be at some position other than the end of the string (which may not be vibrating). Accordingly, the response of a magnetic pickup may be subject to comb filtering, which may correspond to a series of nulls in the frequency response spectrum of signals provided by the pickup system. When a string is vibrating, the vibrational wave in the string is propagated to the ends of the string and reflected along the string in the opposite direction. Magnetic coil pickup sensors may only sense this transvers displacement of the vibrating string within a narrow aperture of a magnetic field. In case the pickup system or sensor is placed or positioned at any location along the string other than the exact center, the reflected waves may arrive at the sensor at different times, which may give rise to phase cancellation at the sensor's aperture. This phase cancellation may therefore create various nulls of varying depths in the frequency spectrum produced by the pickup system. The introduction of these nulls may manifest as peaks in the spectrum, resulting in an altered or changed sound compared to non-amplified instrument Acoustic instruments are designed as mechanical amplifiers where the chamber resonances and top resonances shape the acoustic "voice" of the instrument. The addition of resonances from comb filtering may conflict with and degrades the balance of natural mechanical resonances in the original instrument's mechanical design, which may result in an altered sound, or sound response not utilizing or not corresponding to the instrument's natural acoustic properties.

Some embodiments of the invention may provide a pickup system or device optimized for acoustic instrument amplification-such as for example acoustic guitar amplification—that may mitigate and/or overcome some of the challenges and shortcomings of various amplification systems and devices, e.g., as discussed herein.

As used herein, an acoustic guitar may refer to a stringed musical instrument that produces sound acoustically by transmitting the vibrations of its strings through its bridge and saddle to the soundboard or guitar top. The soundboard amplifies these vibrations, resonating within the guitar's hollow body and projecting sound through the sound hole or acoustic cavity. The instrument may have, e.g., six strings, and may include a fretted neck or fretboard, and may be constructed from various tonewoods to influence its acoustic properties. Acoustic guitar strings may be, e.g., metal or steel strings, and some strings may include with a winding of for example bronze, phosphor bronze, or 80/20 bronze (a mixture of 80% copper and 20% zinc). Unlike, e.g., electric guitars, which rely on external amplification to generate sound, and which may have solid or semi-hollow bodies that contribute minimally to sound production, an acoustic guitar generates and amplifies sound acoustically through the vibration of the strings and the resonant properties of the instrument's wooden structure.

Some embodiments of the invention may allow amplifying acoustic plucked instruments while preserving their natural resonant properties (as projected, e.g., from their wooden, hollow bodies) and while not causing undesirable sound alterations or coloring. While some embodiments of the invention may be used for electronically amplifying acoustic guitar systems, other embodiments may be used in different systems and/or contexts (such as for example amplifying alternative plucked string instruments, e.g., ukeleles, lutes, and the like, or even solid body "electric guitars").

Some embodiments of the invention may use, include, or conform to a magnet coil pickup design component which may be built using, or may include, e.g., pole pieces or rod magnets and an inductance coil or wire. When a string is plucked, the magnetic field created by the pole or rod magnets may be disturbed or altered, which may create an induced current in the coil, thereby converting sound to an electric signal. The coil or wire may be fixed in or restricted to a specific position using a frame or bobbin apparatus.

"Nulls" and "peaks" as used herein may refer to points in a frequency spectrum where destructive and constructive interference occur, respectively. For example, when a sound signal combines with a delayed version of itself—e.g., as part of comb filtering-certain frequencies may overlap in phase (constructive interference), creating peaks where those frequencies are amplified. Conversely, other frequencies may overlap out of phase (destructive interference), creating nulls where those frequencies are significantly reduced or canceled out. This pattern of alternating peaks and nulls across the frequency spectrum gives comb filtering its characteristic "comb-like" appearance when visualized on a frequency response graph. The presence of these nulls and peaks can lead to an uneven frequency response, coloring the sound and potentially making it sound unnatural or thin.

As explained herein, pickup positioning (e.g., when applied to guitars or other plucked instruments) may significantly affect comb filtering. For example, the positioning of a pickup may influence phase relationships between the direct sound from the strings and the reflected or delayed sounds that reach the pickup. When a pickup is placed closer to the bridge of the instrument, it may capture more high-frequency overtones and partials, which can lead to more pronounced comb filtering, as the short wavelengths of these frequencies are more likely to experience phase cancellation or reinforcement. Conversely, placing the pickup closer to the neck of the instrument may result in a fuller, warmer tone with less pronounced comb filtering, as the lower frequencies and longer wavelengths are less susceptible to phase interference.

Some embodiments of the invention may allow for mitigating undesirable comb filtering effects, for example by using a pickup design which allows, in some embodiments relating to acoustic guitar amplification, to position the pickup far away from the bridge of the instrument, or further away than with prior art designs. This may allow moving nulls and peaks closer together in frequency, to introduce a smoothing of the frequency response where individual peaks do not appear as discrete resonances.

FIG. 1 shows an example transducer system according to some embodiments of the invention.

Some embodiments of the invention may provide a pickup or transducer system which may include, e.g., at least one magnet 102A-F; at least one inductance coil 104 coupled to, or wrapped around the magnet(s); and an arc shaped housing enclosing or including the magnet(s) and the inductance coils(s). It may be seen that inductance coil 104 may be arc shaped-see also example manufacturing or production process herein. A guitar transducer system or pickup system according to some embodiments may include a plurality of magnets arranged in an arc and at least one arc-shaped inductance coil wrapped around or coiled around the magnets.

Comb filtering effects on the frequency response of a pickup or magnet(s) may be explained or rationalized with reference to example equations 1-3. The output or response spectrum of a pickup at positions along a string may be expressed as:

$$V_{pickup} = \sin\left((\pi * X_{pickup})/L_{vib}\right) \quad \text{(eq. 1)}$$

Where:

- $V_{pickup}$ is the relative displacement velocity, and thus the relative pickup output level, at this point on the string. A value of 1.0 is the maximum.
- $X_{pickup}$ is the position of the pickup, the distance between the bridge and the center of the pickup in inches.
- $L_{vib}$ is the vibrating length of the string in inches. For a harmonic, use the distance from the bridge to the first node. For the fundamental mode on an open string, this is the scale length.

A frequency response may be computed by relating the vibrating string length to frequency, e.g., using an inverse relationship:

$$F_{string} = F_{open}\left(L_{scale}/L_{vib}\right) \quad \text{(eq. 2)}$$

Where:

$F_{string}$ is the frequency of the vibrating string in Hz, whether the pitch is due to the fundamental or a harmonic of a fretted note or open string.

$F_{open}$ is the fundamental open (unfretted) frequency of the string in Hz.

$L_{scale}$ is the length of the open (unfretted) string in inches.

Substituting in eq. 1 results in:

$$V_{pickup} = \sin((\pi * X_{pickup} * F_{string})/(L_{vib} * F_{open})) \quad \text{(eq. 3)}$$

Eqs. 1-3 may be used to theoretically predict or explain frequency response spectra of amplification and pickup systems, and specifically comb filtering effects based on, e.g., plotting response or output spectra as a function of the values and/or parameters described herein with regard to different embodiments of the invention. As demonstrated herein, response spectra may include a plurality of peaks and/or nulls defining or describing the amplified sound and/or tone. Different parameter values (such as, e.g., the placement or position of the pickup along a string, or the distance of a pickup from the bridge of the instrument) may produce different nulls and peaks in the corresponding frequency response spectrum, and may accordingly effect or alter the sound of the instrument, e.g., due to comb filtering and interference effects.

Figure 2:
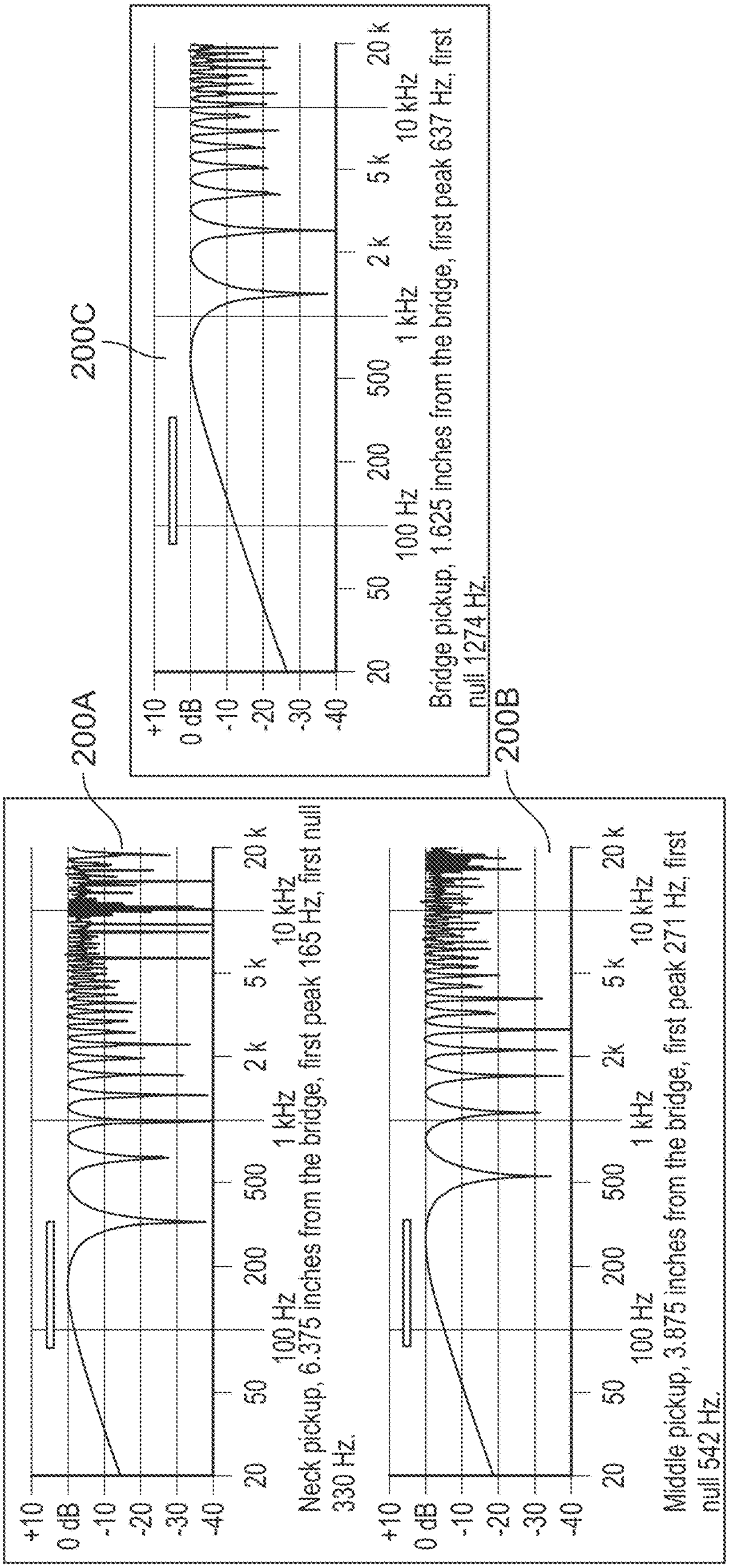
FIG. 2 illustrates relationships between pickup response and pickup positioning considered in some example embodiments of the invention.

FIG. 2 illustrates relationships between pickup response and pickup positioning considered in some example embodiments of the invention.

Positioning a pickup or magnet at different distances from an instrument's bridge may result in different frequency responses: see, e.g., frequency response spectra 200A-C, each describing a frequency response of a given pickup or magnet placed at varying distances from the bridge (where placements may be referred to as "neck", "middle", and "bridge" configurations). Frequency response spectra 200A-C may differ by the locations of peaks and/or nulls in the spectrum, which may be heard or perceived as corresponding differences in tone between the different pickup placements, or in a characteristic tone for each placement, position, or configuration.

Figure 3:
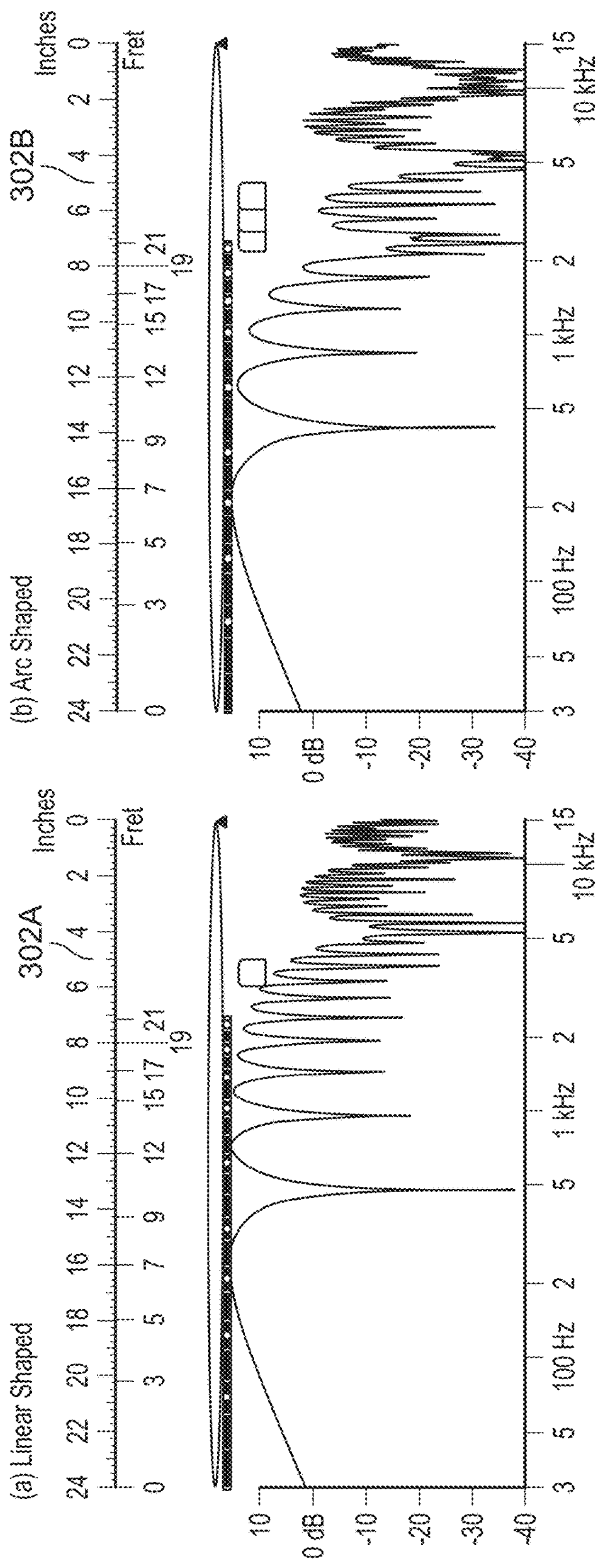
FIG. 3 shows example frequency response spectra for different pickup shapes, placements, or configurations according to some embodiments of the invention.

FIG. 3 shows example frequency response spectra for different pickup shapes, placements, or configurations according to some embodiments of the invention.

For an example open string frequency of 110 Herz (Hz), which may correspond to the frequency of an open A string of an acoustic guitar, placing six magnets or pickups at single or at a uniform distance from the bridge 300A (e.g., of substantially (+−5%) 5.5 inches) may result in a frequency response spectrum 302A. Placing six magnets or pickups at varying distances from the bridge 300B (e.g., ranging between substantially 5.5-7.0 inches, or at distances of substantially 5.5, 6.25, 7.0, 6.25, and 5.5 inches from the bridge, respectively—which may describe or correspond to an arc shape or configuration) may result in a frequency response spectrum 302B. It can be seen that spectrum 302B includes peaks and nulls having different spectral shifts and amplitudes or depths compared to spectrum 302A: the two spectra may describe different guitar tones, as produced using different pickup systems. While FIG. 3 illustrates a frequency response of a single A string amplified using a plurality of magnets and/or pickup systems, it may be used to illustrate similar implications (e.g., both quantitative and qualitative) on the frequency response received from 6 guitar strings where each string is placed above a corresponding magnet. See also, e.g., FIGS. 4-8 describing example pickup or housing placement considerations and measurements according to some embodiments of the invention.

FIG. 4 illustrates example positioning considerations used for pickup devices according to some embodiments of the invention.

Some magnet coil pickups for acoustic guitars may include, e.g., pole pieces or rod magnets arranged in a straight line. A section of the pickup containing the magnets and/or coil may protrude into the circular acoustic or sound hole, and the center of the pickup's sensing aperture and/or the resulting location of the aperture may form a non-diameter chord within the sound hole. As the diameter of the sound hole on some example acoustic guitars runs around 3.875"-4.0", a resulting position of the straight-line device or aperture may be, e.g., approximately (e.g. +−5%) 6.2" away from the bridge 402 or, e.g., between substantially (+−5%) 5.5-6.0 inches from bridge 402 (see also, e.g., FIG. 6). An example gap 404 between the location of a straight pickup according to some embodiments and the end of the finger board 406 may be between 1.0"-1.25".

Some embodiments of the invention may use or require an arch or arc-shaped pickup (as opposed to, e.g., a straight line). According to some embodiments, an arch shaped aperture or housing enclosing or including pickup system components (including, e.g., magnets, inductance coils, etc.) may be moved into or placed in gap 404 or towards the edge of the sound hole, or may be placed along the edge of the sound hole so that there is no gap between the pickup and the edge of the sound hole, and/or the pickup does not divide the sound hole in two sections, and may be moved farther away from the instrument's bridge than a straight-line pickup which is typically placed across a diameter of the sound hole. Accordingly, some embodiments may achieve benefits such as:

- Moving the pickup into gap 404 or towards the edge of the sound hole may cause comb filter nulls to be closer together, which may create a smoother frequency response.
- Moving the pickup into gap 404 may allow the pickup to be less obstructive of the sound hole. In this position, the pickup may be further away from a strumming position and may be less likely to be hit during strumming.
- Moving the pickup into gap 404 may decrease the stiffening of the vibrating top plate or sound board of the instrument. Since the top may already be stiffened, e.g., by the fingerboard, at or around gap 404, the pickup may add no further stiffness to the top plate when placed in G. (Stiffening as used herein may refer to increasing the rigidity of components like the top plate or soundboard in an acoustic instrument, which may affect its ability to vibrate or resonate. Proper resonance may require, e.g., the top plate to vibrate freely; too much stiffening of the plate may reduce its vibration, leading to less resonance and a corresponding, e.g., softer or duller tone. Avoiding placing or gluing objects on the outside surface or inside surface of the top plate may minimize additional stiffening, allowing the already stiffened top plate (by the fingerboard or other parts) to maintain its natural resonance and vibrational qualities, preserving sound quality).
- Since the comb filtering and corresponding null and peak frequencies may be a result of the vibrating string's length (e.g., the "musical note" of the string) and the pickup's position along the vibrating length, an arc shaped aperture may create a very different set of composite resonances compared to, e.g., a straight-line aperture. An arrangement of resonances resulting from an arc shaped pickup according to some embodiments may differentiate the resulting character of the sound from, e.g., those achieved using straight line shaped pickups, such as for example ones used in electric guitar related applications.

Moving the pickup's position into gap 404 may also offer aesthetic benefits that may be more compatible with, e.g., the circular shape of the sound hole (and may for example not hide, cover, or cross it as may be the case for straight line shaped pickups).

In some embodiments of the invention, the arc may be positioned concentrically or nearly concentrically with respect to the center of the sound hole and may be located on the upper portion of the sound hole circumference (where the upper portion may refer to the portion of the sound hole being closer to the fingerboard), where the center of the arc shape may be located at the intersection of an imaginary line drawn from the center of the sound hole and the middle point of the fingerboard's edge, width or lower portion (where the lower portion may refer to the portion at the edge of the fingerboard being closest to the guitar's body and farthest from the headstock). Different positionings may be used in different embodiments.

Formants as used herein may refer to frequency peaks in a sound spectrum associated with a high energy. Formants may be prominent, for example, in spoken vowels, where each formant may correspond to a resonance in the vocal tract. Peak resonances created by comb filtering (such as for example illustrated in FIG. 3) may be formant-like in nature and, when occurring at specific frequencies and in specific proportion, may generate sounds that may sound surprisingly similar to spoken vowels. Some embodiments of the invention may improve guitar amplification and sound technologies by relying on comb filtering effects and resulting formants, resulting in a tone or sound characteristic or unique to, e.g., arc shaped pickup systems and designs. Some embodiments of the invention may provide an arc shaped pickup system generating or producing a characteristic frequency response (as shown, e.g., in example spectrum 302B) where undesirable sound outputs or byproducts such as, e.g., for example string squeaks, fingers sliding sounds, arm or clothing rubbing sounds, undesirable percussive sounds or noises may be less dominant, or less pronounced. This aspect may be beneficial, for example, for less experienced players which may wish to eliminate or minimize undesirable sound byproducts which they may not be able to eliminate based on their playing technique alone. Additional or alternative tone or sound improvements characteristic to the arc shaped pickup configurations described herein may be provided in different embodiments.

In some embodiments, the at least one inductance coil has an inductance value below 3000 millihenries (mH).

For example, some embodiments of the invention may include or use passive guitar pickups, for which a frequency response may contain resonances (such as for example ones created by the inductance coil itself) that may behave or act, e.g., as a filter—such as for example a second order low pass filter in a frequency range of 2 kilohertz (KHz) to 8 KHz. However, in some embodiments, such tonal coloring resonances or peaks may be undesirable as they may alter the natural acoustic resonant character of the instrument. Some embodiments may use magnet coil pickups for that may be nearly flat (and non-filtered) responding devices. A non resonant response of the coil may be achieved, e.g., by using a very low inductance coil for which the natural resonance may be above the audible range, such as for example a coil having an inductance value below 3 Henries (H) or 3000 millihenries (mH) or of approximately 3000 millihenries (where approximately may refer to +/−500 mH).

Multi-layer printed circuit coils or multi-layer PCB coils may refer to coils manufactured using printed circuit board (PCB) technology. These coils may include multiple layers of conductive traces on a non-conductive substrate, connected by vias to form the coil. Multi-layer PCB coils and their manufacturing may allow for precise control over the coil's characteristics such as for example inductance and resistance, and may therefore be used to produce systems and devices according to some embodiments of the invention.

Since low inductance coil designs may produce lower output than high inductance devices, the low output level of such coils may be boosted in some embodiments of the invention using, e.g., an active powered gain staging system to be compatible with most musical instrument amplifiers. Active gain staging may also include active filtering components that may provide adjustable tone controls-such as, e.g., bass and treble levels, etc. The active circuit may also include user accessible switching to choose between preset volume levels or preset tone filters.

FIGS. 5-8 show example pickup system positioning considerations, dimensions, and measurements according to some embodiments of the invention.

Figure 5A:
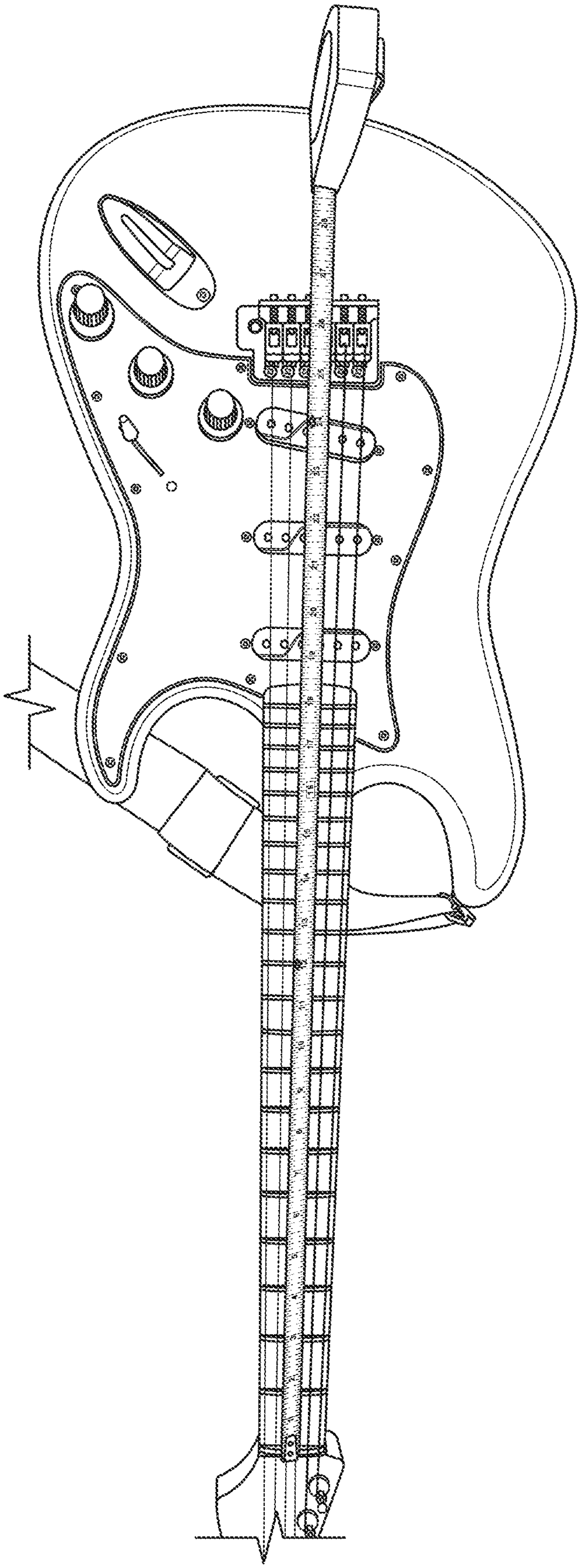
FIG. 5A-B show example measurements and dimensions of an electric guitar on which a pickup according to some embodiments may be mounted.
Figure 5B:
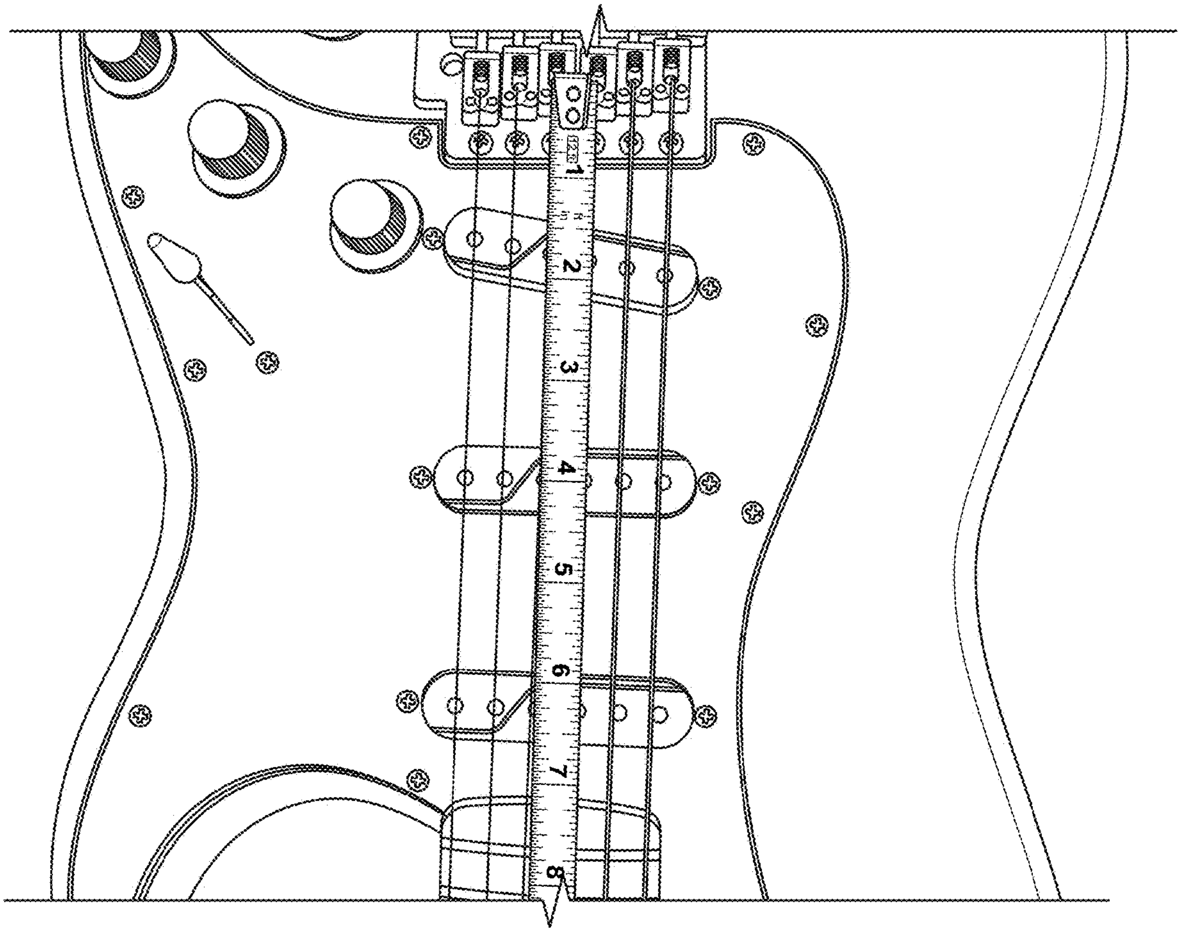

FIG. 5A-B show example measurements and dimensions of an electric guitar on which a pickup according to some embodiments may be mounted.

These figures may be compared with, or be used as references with regard to example acoustic guitar dimensions, measurements, and placement considerations further described herein. In FIG. 5, an example electric guitar straight neck pickup is displayed, located approximately (+−5%) 6.5 inches from the guitar's bridge or from the end of the string. In the nonlimiting example shown in FIG. 5A-B, the electric guitar has an approximately (+−5%) 25.5 inches long scale length (it is noted that other example instruments on which some embodiments of the invention may be mounted may have different dimensions).

Figure 6A:
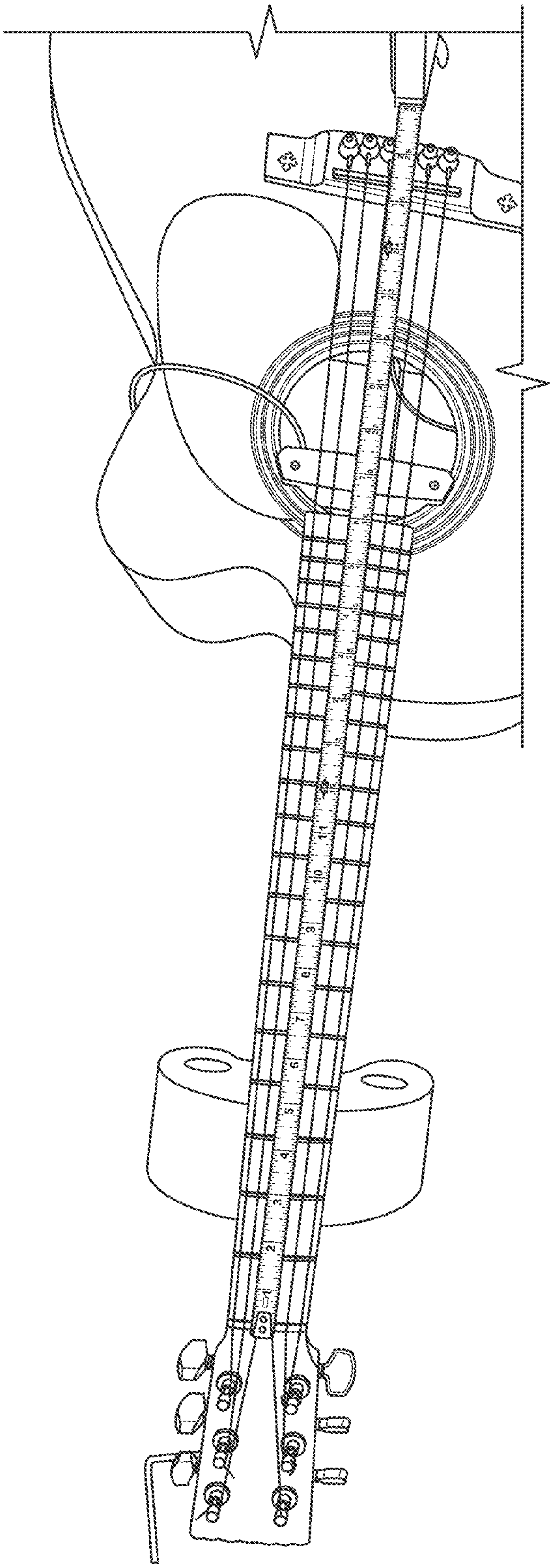
FIG. 6A-B show example linear or straight line shaped pickups mounted on an acoustic guitar according to some embodiments of the invention.
Figure 6B:
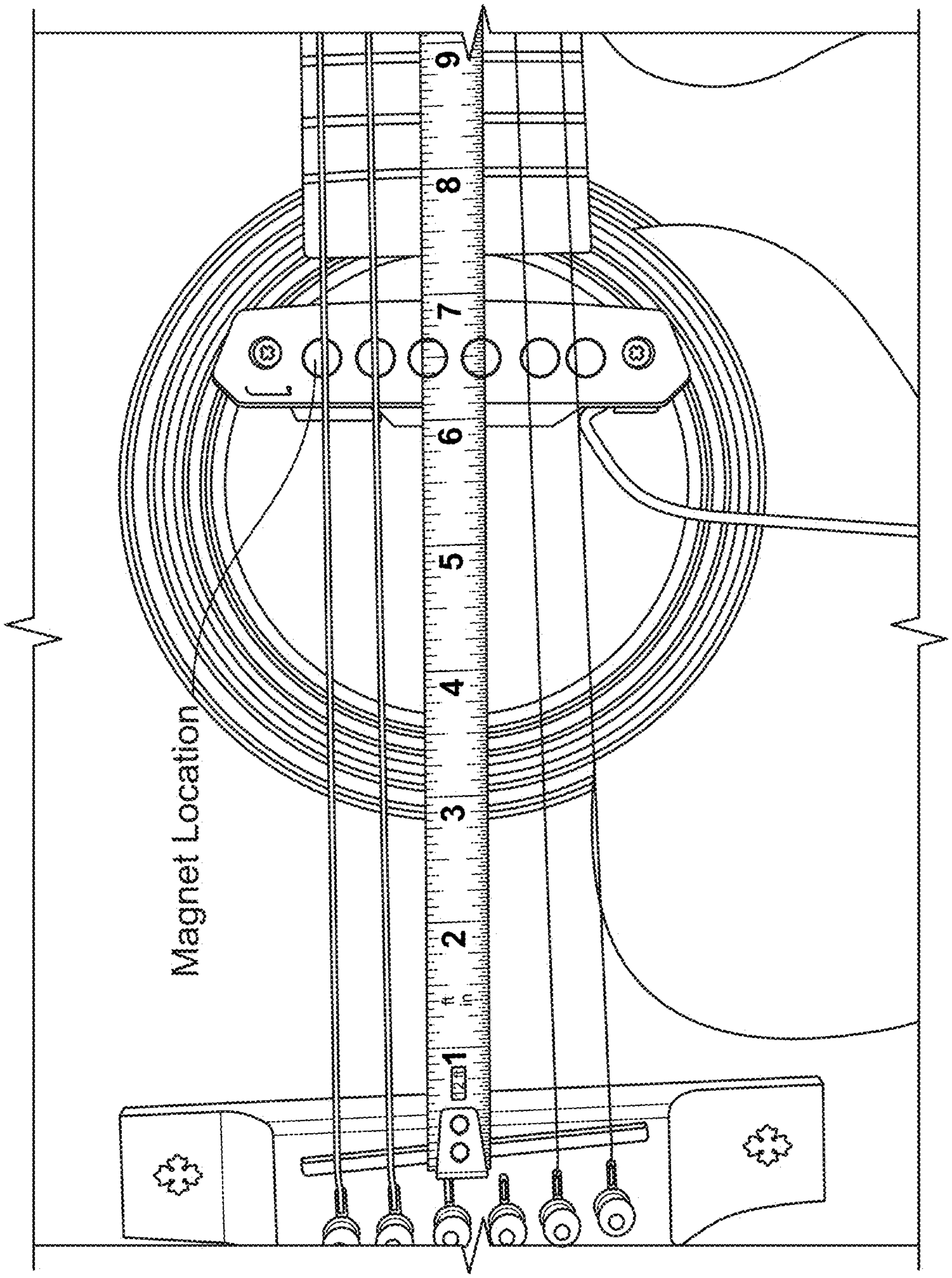

FIG. 6A-B show example linear or straight line shaped pickups mounted on an acoustic guitar according to some embodiments of the invention.

An example acoustic guitar according to some embodiments may have a 25.5 inches long scale length (see measurement in FIG. 6A). As shown in FIG. 6A-B, an example magnetic pickup may be located or placed such that the magnets are around (+−5%) 6.5 inches away from the end of the string and/or 5.5-6 inches away from the top edge of the instrument's bridge (facing the sound hole). As described with reference to FIG. 4, a gap of approximately ¼ inches may exist between the edge, vertex or length axis of the straight line or rectangular shaped pickup and the edge of the neck or fretboard of the instrument.

Figure 7A:
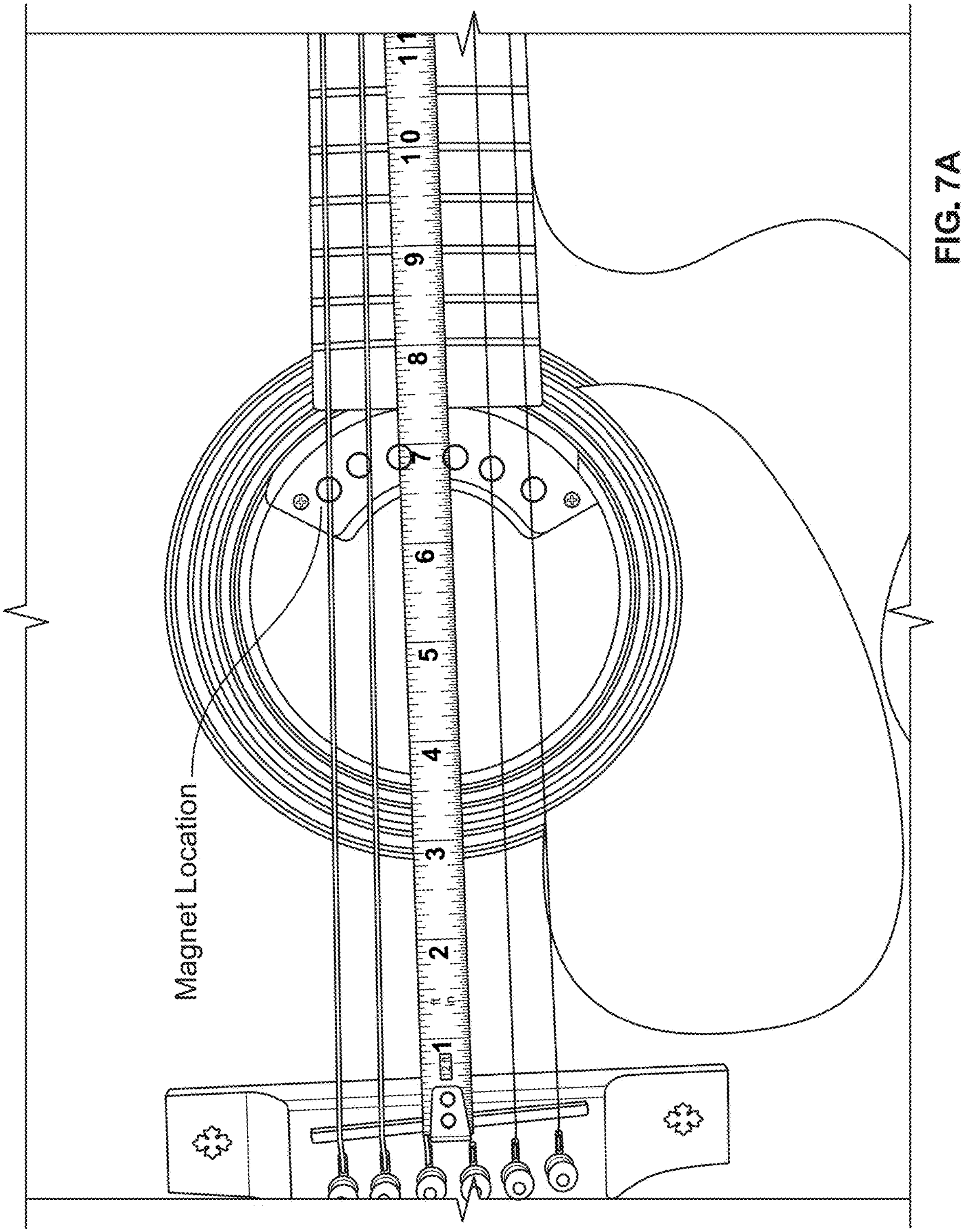
FIG. 7A-C show example arc shaped pickups mounted on an acoustic guitar according to some embodiments of the invention.
Figure 7B:
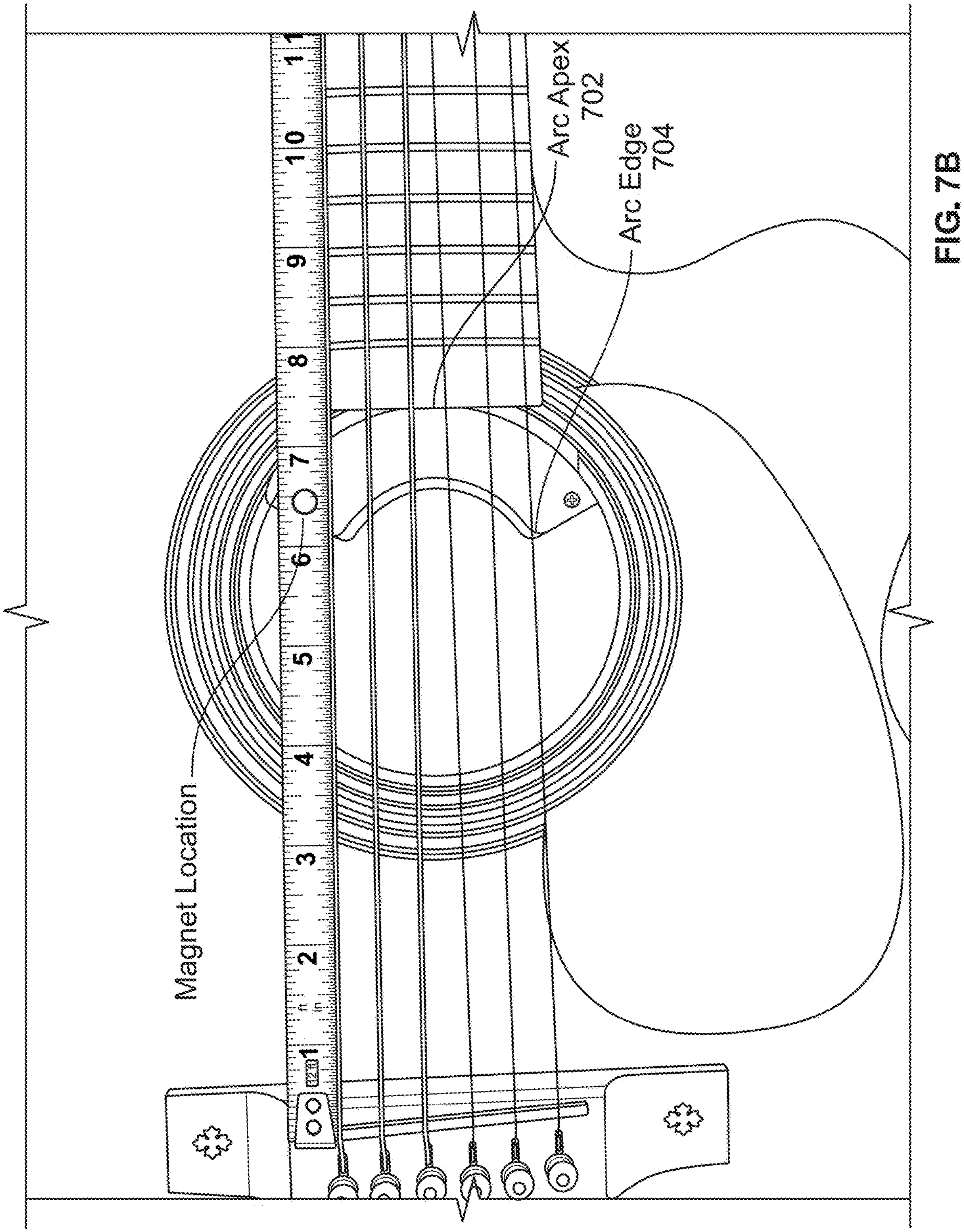
Figure 7C:
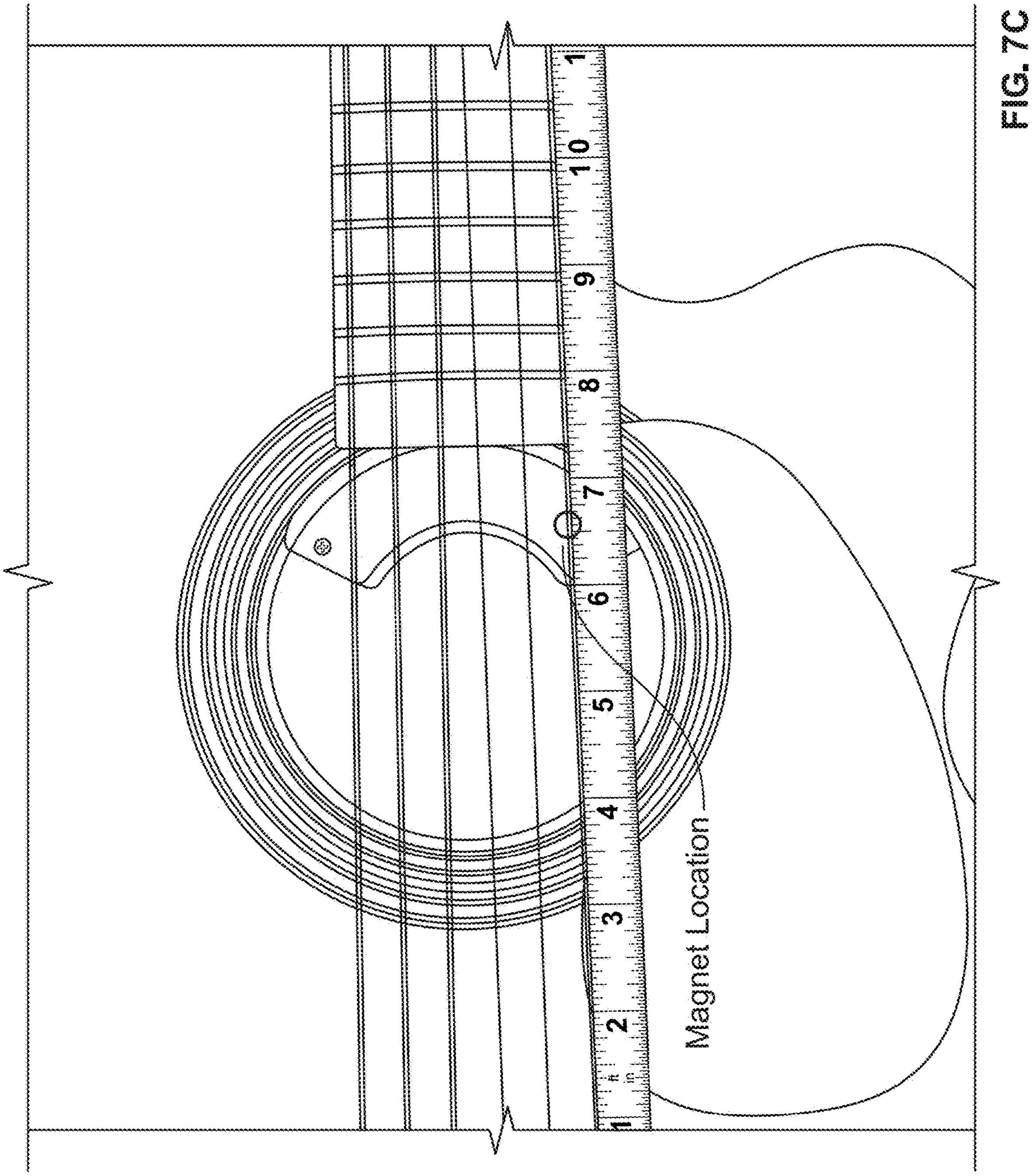

FIG. 7A-C show example arc shaped pickups mounted on an acoustic guitar according to some embodiments of the invention.

In some embodiments, an apex of the arc shaped housing is placed within 7.0-7.5 inches of an edge of a bridge unit of a plucked string instrument.

As shown in FIG. 7A-C, an example arc shaped housing, which may include or enclose a corresponding magnetic pickup system may be located or placed such that a midpoint or apex of the arc shaped housing or pickup may be located or may be placed approximately 7.5 inches away from the end of the string and/or approximately 6.5 inches away from the top edge of a guitar's or plucked string instrument's bridge unit (e.g., the edge facing the sound hole). An arc shaped pickup according to some embodiments may be mounted on or clamped to an upper edge of the sound hole or acoustic cavity. In some embodiments, an apex 702 or middle point of the arc shape may touch or may be positioned or found adjacent to, or substantially next to, the middle point of the instrument's neck unit, or the middle of the neck's width. The arc's apex or top may be found or positioned, e.g., approximately 7.0-7.5 inches from the bridge (farther away from the bridge compared to example linear or rectangular pickups) of the instrument, while the arc's lower edges such as, e.g., arc edge 704 (being farthest away from the neck or fretboard) may be approximately 5.5-6.0 inches away from the bridge (which may be similar to the placement of example linear or rectangular pickups if mounted on the same example instrument or acoustic guitar. Example locations, measurements or dimensions for individual magnets, where each magnet may be found or positioned below a corresponding string and configured to generate a frequency response according to the string's vibration, are also provided.

Figure 8A:
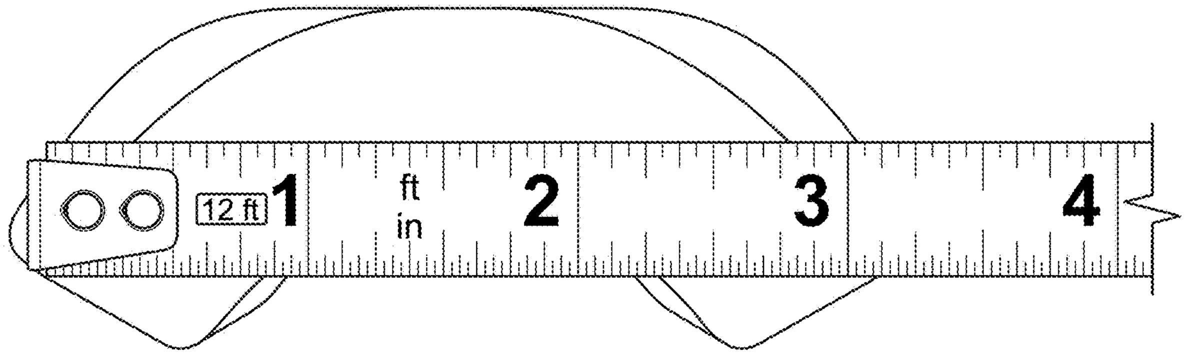
FIG. 8A-B show an example arc shaped pickup or pickup housing according to some embodiments of the invention.
Figure 8B:
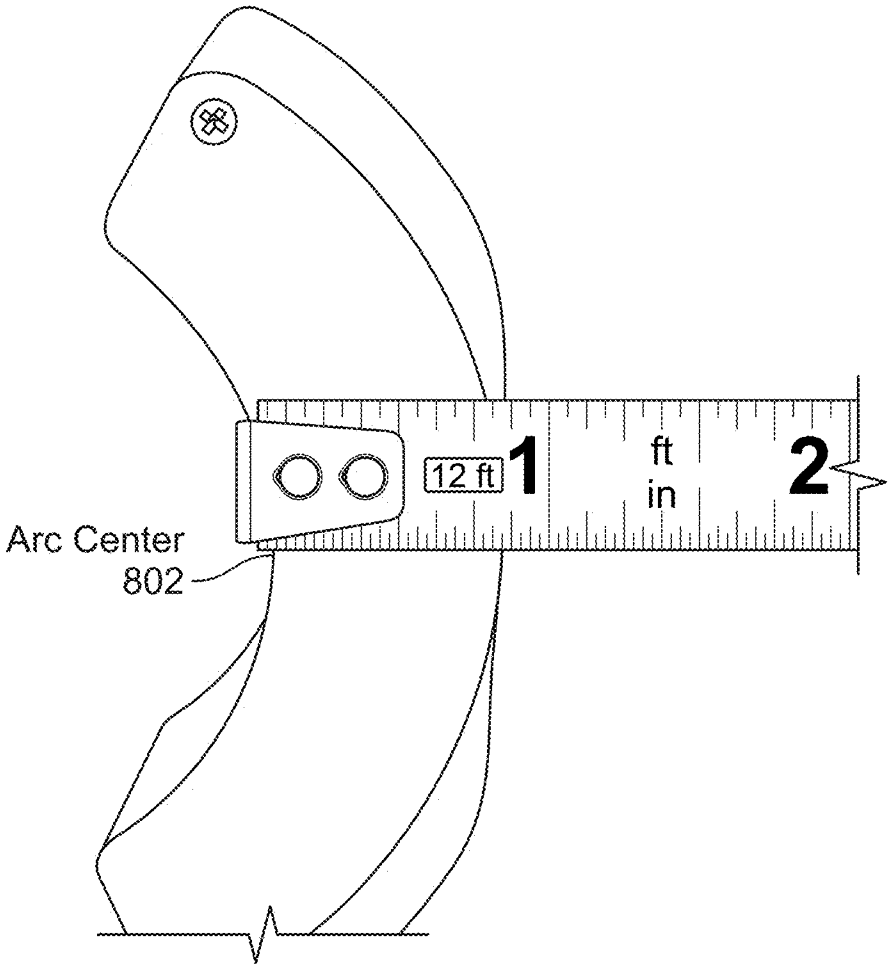

FIG. 8A-B show an example arc shaped pickup or pickup housing according to some embodiments of the invention. A pickup or housing may be, e.g., approximately 3-3¼ inches long (where the length may extend in the direction of the width of a guitar's neck or fretboard) and approximately (¾)-(⅞) inches wide at the center point 802 or middle of the arc shape (which may, e.g., include apex 702). In some embodiments, the width of the pickup or housing may vary and may, e.g., be greater (e.g., approximately 1-1.1 inches) or smaller (e.g., approximately ⅝ inches) along the sides of the arc and further away from the center of the arc.

Additional or alternative dimensions, measurements, and placement considerations or parameters may be considered in different embodiments.

In some embodiments the arc shaped housing is clamped to an upper edge of a sound hole of the acoustic guitar. For example, an arc shaped pickup or housing may be mounted on a musical instrument (such as, e.g., an acoustic guitar or a different, plucked musical instrument) using a clamping system and/or by attaching the pickup close to the edge of the sound hole, e.g., right in front of the neck (which may be referred to as the "top" or upper edge of the sound hole). This part of the instrument's top plate, which may already be stiffened, e.g., by the instrument's neck being glued onto the top plate, may be further stiffened by a large transverse brace that may be glued to the inside of the top plate—for example directly under the end or edge of the neck facing the bridge. Such example mounting of a pickup system may therefore cause no further stiffening of the instrument's top plate—which may prevent undesirable changes to the sound of the instrument resulting from, e.g., stiffening of the instrument's acoustic chamber, and the like.

In some embodiments, the arc shaped housing is positioned adjacent to the end of a fingerboard unit of a plucked string instrument. For example, according to some embodiments, the mounting location or the position at which the pickup may be mounted may be, e.g., as close to the edge of the sound hole and/or adjacent to the end of the fingerboard as possible (such as, e.g., shown in FIG. 6 and/or within 0.2 inches from the edge of fingerboard closest to the sound hole, or the edge of the neck of the guitar or plucked instrument found closest to the sound hole). In some embodiments, a section of a housing including or enclosing the pickup system may include an apex which may allow or enable mounting the housing and pickup at the end or edge of the fingerboard facing the bridge.

In some embodiments, the arc shaped housing is aligned with a circumference of an acoustic cavity of the plucked string instrument.

For instance, according to nonlimiting examples shown in FIGS. 7, 10 here, the arc shaped transducer system and/or housing may be aligned with an arc or with the circumference of the sound hole, or the acoustic cavity of the plucked string instrument. For example, according to FIG. 7A-B, an arc shaped housing may be mounted on an acoustic guitar such that an outer portion or the arc shaped housing may be an arc of a circle having a diameter similar (e.g., within a value of 0.2 inches) to that of the sound hole or acoustic cavity. In some embodiments, a circle including the arc may overlap with the circumference of the sound hole or acoustic cavity. In other embodiments, a circle defined by the arc shape (e.g., by extending the arc until closure to a full circle is achieved) may be a circle smaller or larger than the sound hole. The arc shaped pickup or housing may be "aligned" with the sound hole or cavity, for example, in the sense that that (A) a circle defined by the arc shape of the housing or pickup substantially overlaps with the circle of the sound hole (e.g., such that the two circles have a diameter within a difference of 0.2 inches, and such that the circumferences of the two circles are within a distance of 0.1 inches), or (B) a circle defined by the arc shape of the housing or pickup is defined by a perimeter larger or smaller than the perimeter of the sound hole, and the circumferences of the two circles do not cross each other even once.

Additional or alternative mounting configurations may be included in different embodiments.

FIG. 9A-E show an example manufacturing process of inductance coils for a pickup device according to some embodiments of the invention.

Figure 9A:
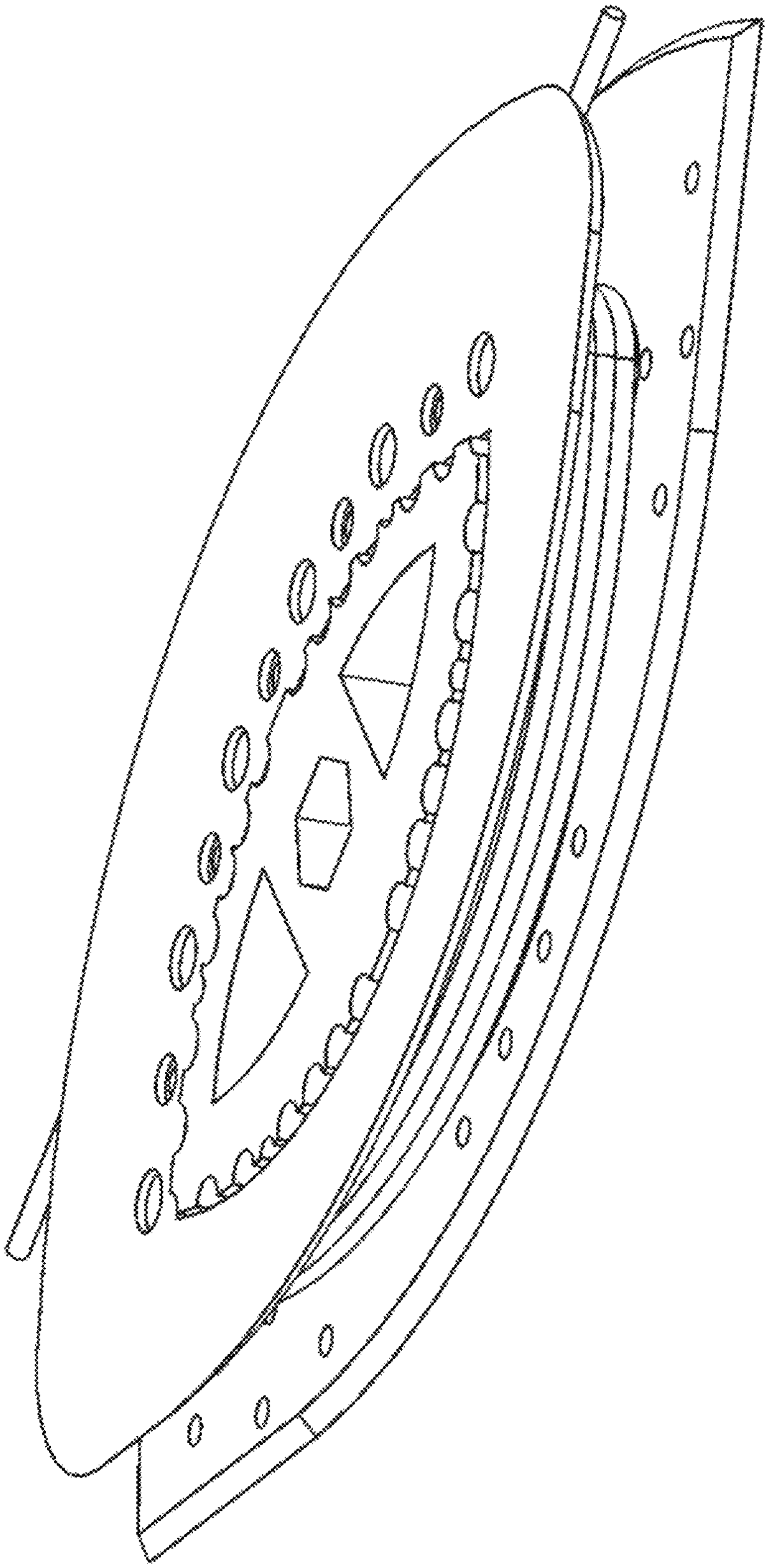
FIG. 9A-E show an example manufacturing process of inductance coils for a pickup device according to some embodiments of the invention.
Figure 9B:
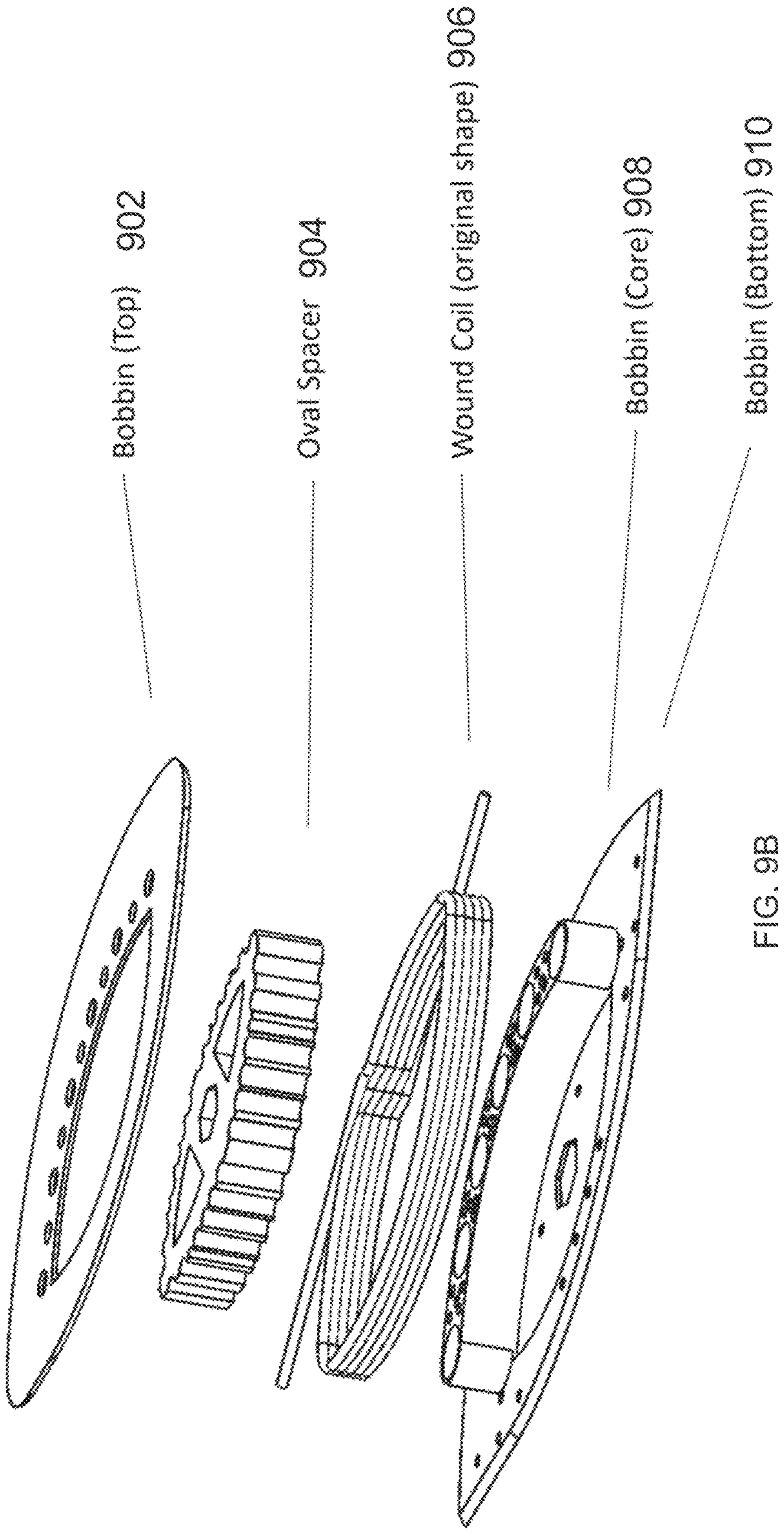
Figure 9C:
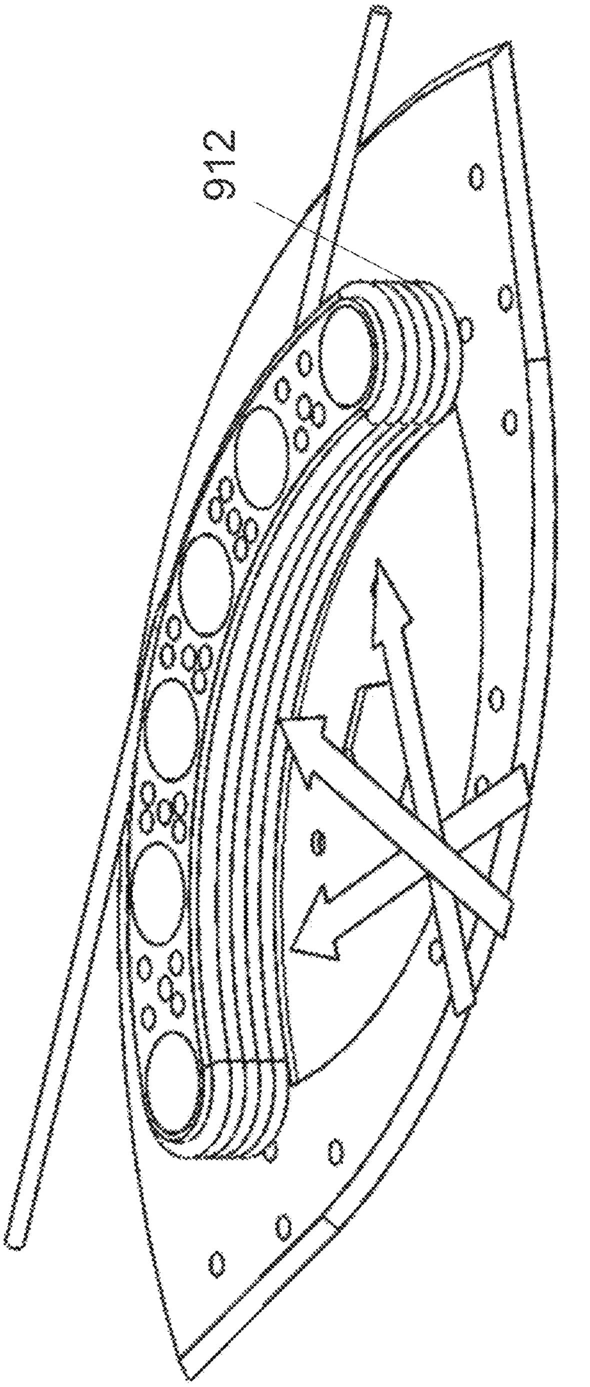
Figure 9D:
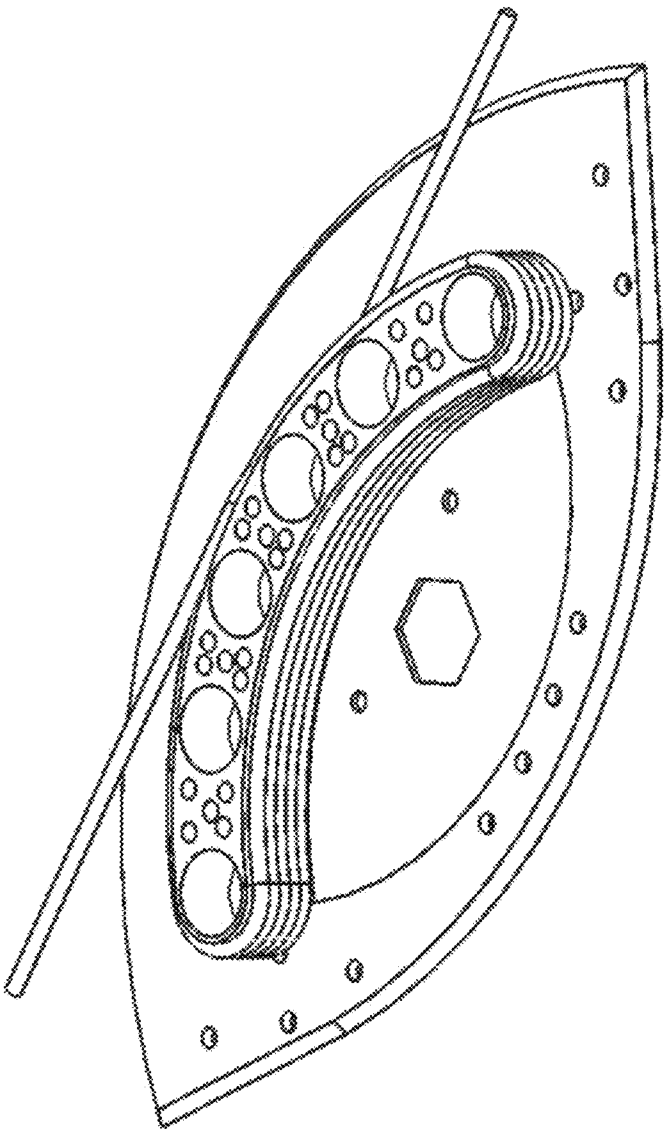
Figure 9E:
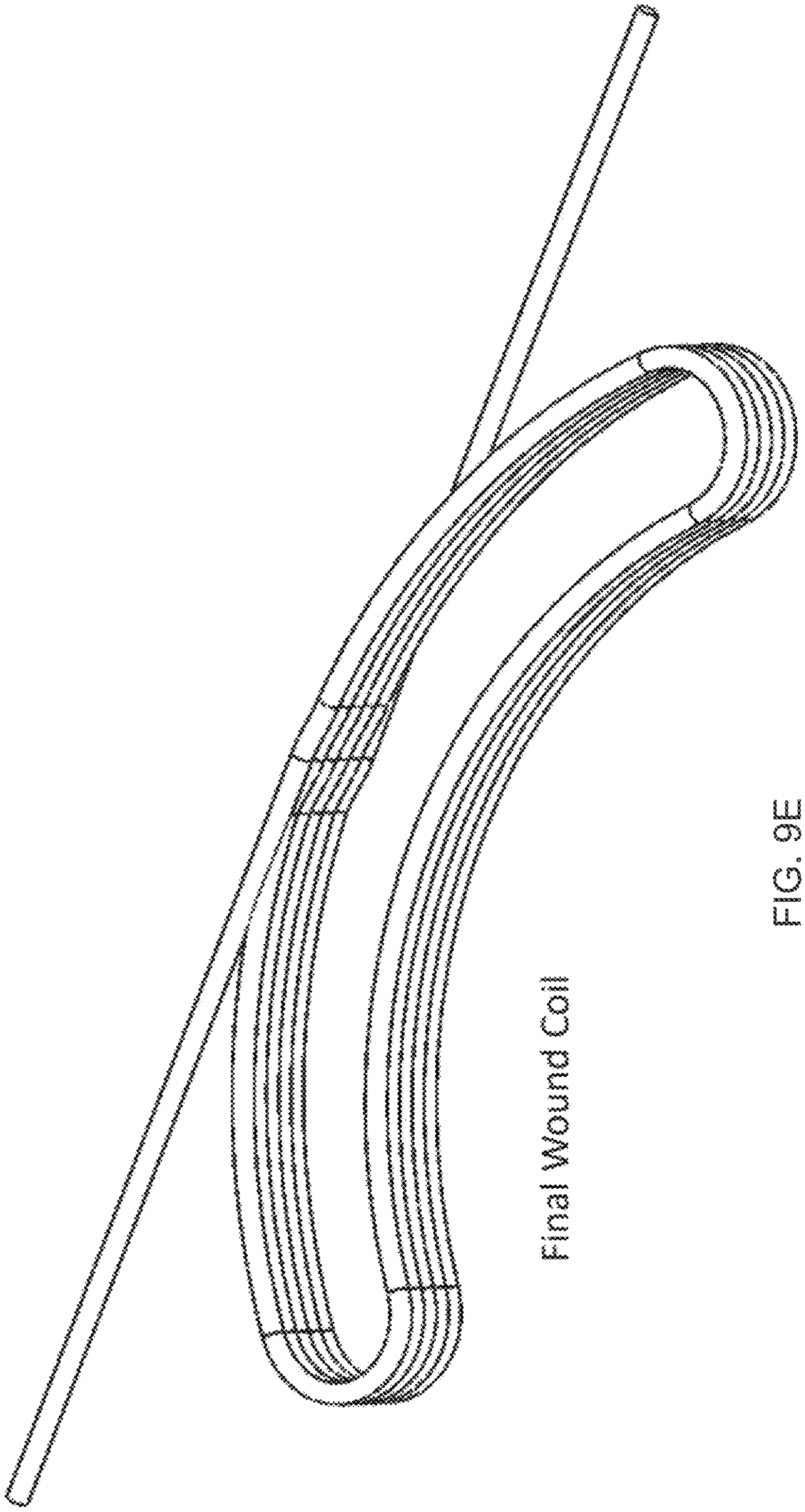

In some embodiments, the at least one inductance coil is arc shaped, and at least one inductance coil is produced by winding the at least one inductance coil around a spinning oval shaped bobbin. For example, some embodiments of the invention may include or may use an arc shaped wound wire or coil. An arc shaped wound wire according to some embodiments may be produced by winding a fuse-able magnetic wire on or around an oval shaped bobbin or a spinning bobbin assembly (FIG. 9A). In some embodiments, the bobbin may include a plurality of parts (FIG. 9B), such as for example a top unit 902, a spacer unit 904, a core unit 908 around which the wire or coil 906 may be shaped, and a bottom unit 910. The top unit 902 and spacer 904 may be removed, and the wound coil may be pushed inward against core unit 908 to form a crescent moon shape 912 (FIG. 9C). The formed, arc shaped wound coil may be fused and solidified (FIG. 9D), and may then be removed from the core and bottom units 908, 910 (FIG. 9E).

According to some example embodiments, a multi part winding bobbin assembly may enable or allow winding a coil using standard winding device or machine. Standard winding machines that may be used for producing some example embodiments may have or may include, for example, a shaft attached to a motor that may be rotated during the winding process, e.g., to spin the oval shaped bobbin. A magnet wire may be fed onto the spinning oval shaped bobbin, e.g., by a wire guide that may traverse back and forth at a distance that equals, or that is substantially similar to the width of the bobbin. This may create even layers of wire that may fill the bobbin's core. The wire's tension may also be controlled by a standard tensioning device that may provide or may generate an even tension in the wire as the layers fill the bobbin. Additional or alternative wire or coil winding procedures may be used for producing different embodiments of the invention.

Some embodiments of the invention may mitigate or eliminate electromagnetic interference (EMI) and corresponding undesirable noise or implications on sound quality. Some embodiments may employ or include multicoil humbucking designs and rigorous shielding to mitigate EMI effects.

A humbucker as referred to herein may be a configuration or type of pickup designed to reduce unwanted noise and interference, or particularly hums caused by EMI. It may include two coils of wire wound in opposite directions and connected in series, with the magnetic poles of the two coils reversed relative to each other. This configuration may cancel out the large field noise picked up by the coils while preserving the musical signal from the guitar strings, resulting in a clearer, hum-free sound with a thicker and warmer tone compared to single-coil pickups.

A stacked humbucker may be a configuration or type of humbucker, where the two coils are stacked vertically on top of each other rather than placed side by side. This design may allow the pickup to fit into a smaller space, making it suitable, e.g., for guitars that are designed for single-coil pickups but require the noise-canceling benefits of a humbucker.

Some embodiments of the invention may provide a transducer or pickup system including at least two inductance coils arranged in a stacked humbucking configuration. For example, in some embodiments, two coils may be used, e.g., in a stacked humbucking configuration, where individual cylinder magnets may be placed or located in alignment with the strings or an arc shaped composite rubber magnet (see nonlimiting examples in FIG. 10). An additional arc shaped printed circuit board (PCB) layer may support the active electronic gain circuit components.

Figure 10C:
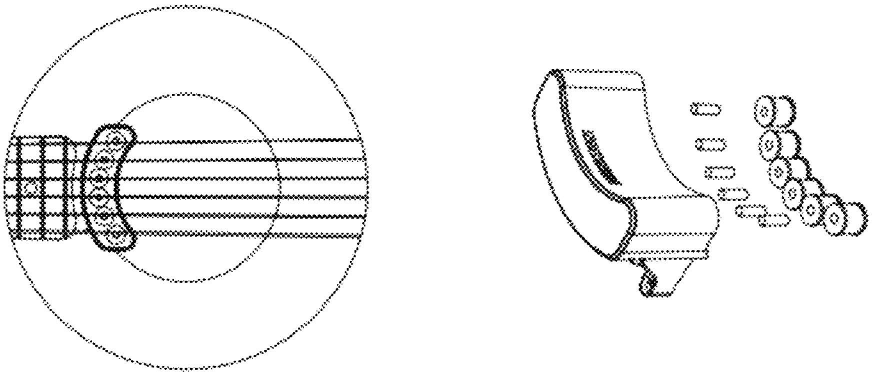
FIG. 10A-C show some example pickup devices and designs according to some embodiments of the invention.
Figure 10B:
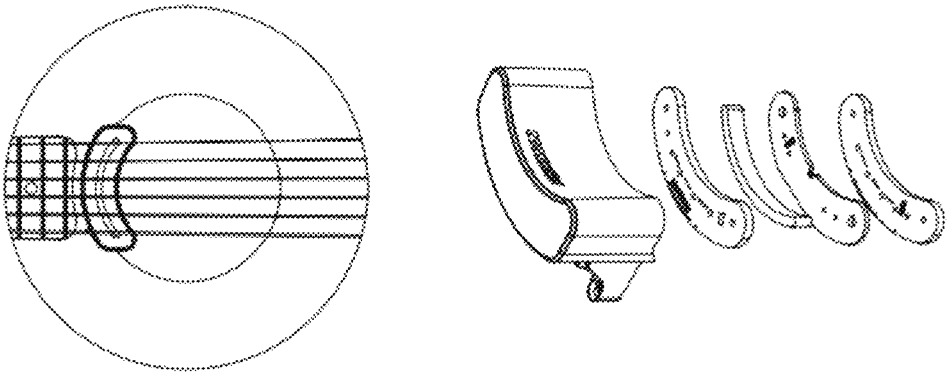
Figure 10A:
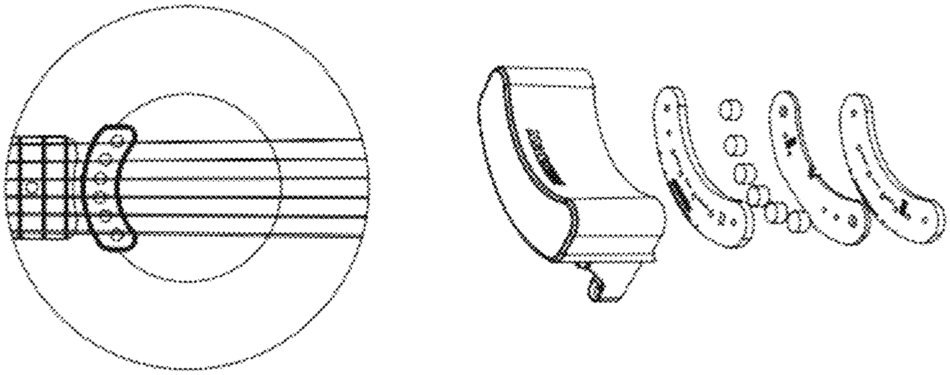

FIG. 10A-C show some example pickup devices and designs according to some embodiments of the invention.

In some embodiments of the invention, the pickup system and/or its shell, cover, or housing may be shaped as and/or placed in an arc or portion of a circle that, e.g., hugs the edge of the sound hole and may be aligned with the sound hole or acoustic cavity, e.g., in the sense that it does not cross an open portion of the sound hole.

In some embodiments, at least one magnet is selected from a group consisting of: a cylinder rod magnet, and a curved composite rubber magnet. For example, some embodiments of the invention may use or include multi-layer printed circuit coils. For example, two multi-layer coils may be placed or arranged in a stacked humbucking arrangement or configuration with, e.g., cylinder rod magnets (which may be, e.g., Alnico 2 magnets or a different type of magnets; FIG. 10A) or with a curved composite rubber magnet (FIG. 10B) along with a third arc shaped PCB layer that may support active electronic gain components. Additional or alternative magnet types may be used in different embodiments.

Some embodiments of the invention may provide a transducer or pickup system including a plurality of magnets, and a corresponding plurality of inductance coils, where each inductance coil may enclose a corresponding magnet of the plurality of magnets, where the plurality of inductance coils is mounted along the arc shaped housing. For example, some embodiments may use or include individual round bobbin inductance coils and rod magnets—where, e.g., each round coil may enclose a corresponding rod magnet. Coils and magnets may be mounted along an arc shaped housing, e.g., in an arc pattern with the individual coils following the arc—for example at a spacing matching or corresponding to the string spacing (FIG. 10C). An arc shaped PCB layer or unit supporting active electronic gain components may also be included in this configuration or assembly.

Additional or alternative configurations may be used in different embodiments.

Figure 11:
FIG. 11 shows an example method for amplifying an acoustic guitar according to some embodiments of the invention.

FIG. 11 shows an example method for amplifying an acoustic guitar according to some embodiments of the invention.

According to some embodiments of the invention, an example method is provided for amplifying a musical instrument using a pickup transducer system, where the system may include one or more magnets, one or more inductance coils coupled to, wrapped around, or coiled around the magnets, and an arc shaped housing enclosing the magnets and the inductance coils. An example method according to some embodiments may include, e.g. attaching or mounting the arc shaped housing or transducer system at the edge of a sound hole of an acoustic guitar (operation 1110)—such as for example furthest from the bridge and closest to the fretboard or fingerboard of the guitar or instrument (e.g., within 0.2 inches from the fingerboard or neck of the instrument); and picking up or receiving signals at the coils based on vibrations of the strings (operation 1120), where the signal may be produced by, e.g.: generating a magnetic field by the magnets included in the pickup transducer and positioned beneath a set of metal strings on a musical instrument; detecting a change in the magnetic field caused by the vibrations of the metal strings of the guitar within the generated magnetic field; inducing an electric current in the coils in response to the detected change in the magnetic field; and transmitting the electric current from the coil to an output device (such as for example a speaker, amplifier, or sound processor) for further amplification and/or sound processing.

Figure 12:
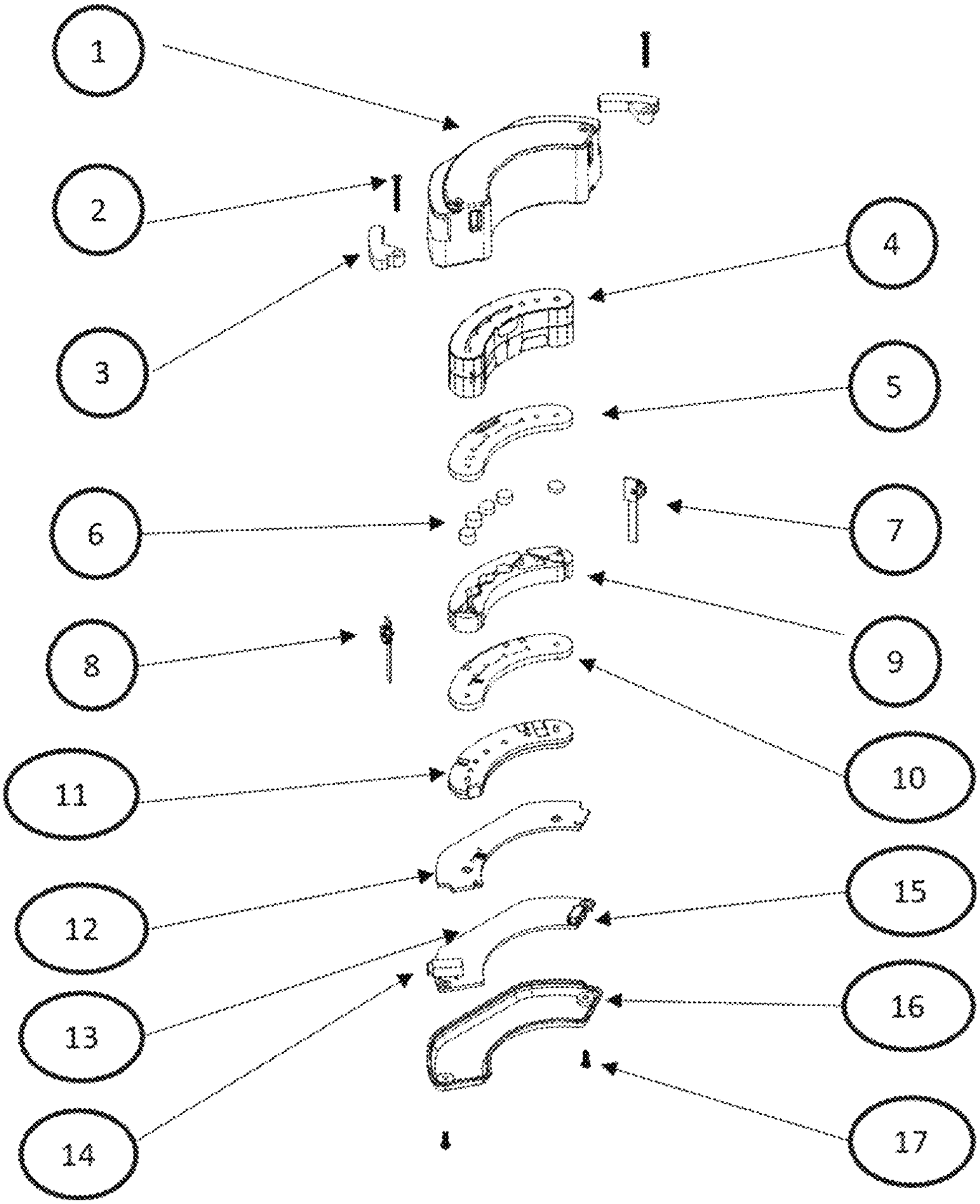
FIG. 12 shows example components of a pickup system according to some embodiments of the invention.

FIG. 12 shows example components of a pickup system according to some embodiments of the invention.

Some example components of some pickup systems and/or pickup designs according to some embodiments may include, e.g.:

- Main housing 1 (which may be made of or molded from, e.g., acrylonitrile butadiene styrene (ABS)).
- Clamp screw 2
- Mounting clamp 3 (in some embodiments, adjustable clamps may secure the pickup to the sound board and may be installed manually, e.g., by a user, and independently from the instrument's manufacturing process, on most standard acoustic guitars).
- EMI shield-folded 0.004" brass 4
- Main printed sensing coil 5
- Neodymium magnets 6 (in some embodiments, only 5 magnets may be needed to compensate for wound $4^{th}$ string).
- Volume or tone control 7 (e.g., for a second "voice").
- Master volume control 8
- Magnet position spacer 9
- Humbucking coil 10
- Coil termination board and secondary EMI shield board 11
- Preamp (gain and filtering) PCB and surface mount components 12
- PCB for output jack and voice switch 13
- Output jack 14
- Voice selection switch 15
- Bottom housing cover 16 (which may, e.g., be made of or molded using ABS)

Bottom cover attachment screw 17

Additional or alternative components or subcomponents or parts may be used in different embodiments of the invention.

Some embodiments of the invention may improve sound amplification technology by providing a pickup system and design having at least the following desirable features:

They may be easy to install or remove without causing damage to the instrument.

They may be highly feedback resistant.

They may not amplify undesirable inputs such as, e.g., finger squeaks or taps, picking noise, body rubs, and the like.

Which may be lacking in some existing amplification systems or combinations of systems.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A transducer system comprising:

a magnet;

a printed circuit board inductance coil coupled to the magnet, wherein the printed circuit board inductance coil is arc shaped; and an arc shaped housing enclosing the magnet and the printed circuit board inductance coil, wherein the arc shaped housing is aligned with a circumference of an acoustic cavity of a plucked string instrument, and wherein a midpoint of the arc shaped housing is positioned adjacent to a midpoint of a width of a neck unit of the plucked string instrument.

2. The transducer system of claim 1, wherein an apex of the arc shaped housing is placed within 7.0-7.5 inches of an edge of a bridge unit of the plucked string instrument.

3. The transducer system of claim 1, wherein the printed circuit board inductance coil has an inductance value below 3000 millihenries (mH).

4. The transducer system of claim 1, comprising: at least two inductance coils including the printed circuit board inductance coil, the at least two inductance coils arranged in a stacked humbucking configuration.

5. The transducer system of claim 1, wherein the magnet is a composite rubber magnet.

6. The transducer system of claim 1, wherein the arc shaped housing is mounted on an acoustic guitar.

7. The transducer system of claim 1, wherein the arc shaped housing is clamped to an upper edge of a sound hole of the acoustic guitar.

8. The transducer system of claim 1, wherein the arc shaped housing is positioned adjacent to the end of a fingerboard unit of a plucked string instrument.

9. A method of amplifying an acoustic guitar using a transducer system, the transducer system comprising:

a magnet;

a printed circuit board inductance coil coupled to the magnet, wherein the printed circuit board inductance coil is arc shaped; and an arc shaped housing enclosing the magnet and the printed circuit board inductance coil;

wherein the method comprises:

mounting the arc shaped housing on the acoustic guitar such that the arc shaped housing is found adjacent to the end of a fingerboard unit of the acoustic guitar, wherein the mounted arc shaped housing is aligned with a circumference of a sound hole of the acoustic guitar, and wherein a midpoint of the arc shaped housing is positioned adjacent to a midpoint of a width of a neck unit of the acoustic guitar.

10. The method of claim 9, wherein the arc shaped housing is mounted on the acoustic guitar such the arc shaped housing is placed within 7.0-7.5 inches of an edge of a bridge unit of the acoustic guitar.

11. A guitar transducer system comprising:

magnet;

an arc-shaped printed circuit board inductance coil coupled to the magnet; and an arc shaped housing enclosing the magnet and the printed circuit board inductance coil, wherein a center of the arc shaped housing is located at an intersection of an imaginary line drawn from a center of a sound hole of a guitar to a middle point of a lower edge of a fingerboard unit of the guitar.

12. The guitar transducer system of claim 11, wherein the arc shaped housing is aligned with a circumference of the sound hole of the guitar.

13. The guitar transducer system of claim 12, wherein an apex of the arc shaped housing is placed within 7.0-7.5 inches of an edge of a bridge unit of the guitar.

14. The guitar transducer system of claim 12, wherein the arc shaped housing is positioned adjacent to the end of the fingerboard unit of the guitar.

15. A transducer system comprising:

an arc shaped housing; and a plurality of magnets, and a corresponding plurality of inductance coils, each inductance coil enclosing and coupled to a magnet of the plurality of magnets, wherein the plurality of inductance coils are mounted along the arc shaped housing, the arc shaped housing enclosing the magnets and inductance coils.

16. A method of amplifying an acoustic guitar using a transducer system, the transducer system comprising:

an arc shaped housing;

a plurality of magnets; and a plurality of inductance coils, at least one inductance coil enclosing and coupled to a corresponding magnet of the plurality of magnets, wherein the plurality of inductance coils are mounted along the arc shaped housing, the arc shaped housing enclosing the magnets and inductance coils; and wherein the method comprises:

mounting the arc shaped housing on the acoustic guitar such that the arc shaped housing is found adjacent to the end of a fingerboard unit of the acoustic guitar.

17. The transducer system of claim 1, wherein positioning of the magnet, the printed circuit board inductance coil, and the arc shaped housing relative to the acoustic cavity and the neck unit produces comb filtering effects manifested as characteristic peak resonances in the frequency response spectrum of the system.

18. The transducer system of claim 1, comprising: a second printed circuit board inductance coil, wherein the second printed circuit board inductance coil is arc shaped, and wherein the magnet is enclosed by the printed circuit board inductance coil and the second printed circuit board inductance coil.

* * * * *